United States Patent
Braunger

(10) Patent No.: US 12,517,375 B2
(45) Date of Patent: Jan. 6, 2026

(54) SPECTACLE LENS DESIGN, SPECTACLE LENS KIT AND METHOD OF MANUFACTURING A SPECTACLE LENS

(71) Applicant: Carl Zeiss Vision International GmbH, Aalen (DE)

(72) Inventor: Dieter Braunger, Essingen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 54 days.

(21) Appl. No.: 18/354,780

(22) Filed: Jul. 19, 2023

(65) Prior Publication Data

US 2023/0367139 A1    Nov. 16, 2023

Related U.S. Application Data

(63) Continuation of application No. 18/319,133, filed on May 17, 2023, now Pat. No. 11,835,799, which is a
(Continued)

(30) Foreign Application Priority Data

Nov. 26, 2020   (EP) ..................... 20211634

(51) Int. Cl.
*G02C 7/02* (2006.01)
*G02C 7/16* (2006.01)

(52) U.S. Cl.
CPC ............... *G02C 7/022* (2013.01); *G02C 7/16* (2013.01); *G02C 2202/24* (2013.01)

(58) Field of Classification Search
CPC ...... G02C 7/022; G02C 7/16; G02C 2202/24; G02C 7/024
See application file for complete search history.

(56) References Cited

U.S. PATENT DOCUMENTS

| 5,867,247 A | 2/1999 | Martin et al. |
| 7,004,585 B2 | 2/2006 | Lindacher |

(Continued)

FOREIGN PATENT DOCUMENTS

| CN | 103268023 A | 8/2013 |
| CN | 107003540 A | 8/2017 |

(Continued)

OTHER PUBLICATIONS

Office Action by the Japanese Patent Office (JPO) issued in JP 2023-532219, which is a counterpart hereof, mailed on Jan. 9, 2024 and English-language translation thereof.
(Continued)

*Primary Examiner* — Tuyen Tra
(74) *Attorney, Agent, or Firm* — Qubit IP, PLLC

(57) ABSTRACT

A spectacle lens design includes a first zone which has a focal power that provides a focused image on the fovea and a given a height and width. A second zone at least partly surrounds the first zone and contains at least one of the following: (i) focusing structures providing a focal power resulting in a myopic defocus or (ii) diffusing structures, such as scattering centers, leading to a diffusion of light passing the second zone. The first zone is curved to follow the converging line of sight of the wearer upon reading and contains a nasal segment, a temporal segment, and a central segment located between the nasal segment and the temporal segment The nasal segment and the temporal segment are shifted downwards with respect to the central segment.

23 Claims, 4 Drawing Sheets

Related U.S. Application Data continuation of application No. PCT/EP2021/083245, filed on Nov. 26, 2021.

(56) References Cited

U.S. PATENT DOCUMENTS

| | | |
|---|---|---|
| 7,862,171 B2 | 1/2011 | Varnas et al. |
| 10,137,645 B2 | 11/2018 | Quere et al. |
| 10,394,054 B2 | 8/2019 | Varnas |
| 2008/0055541 A1 | 3/2008 | Coulter et al. |
| 2010/0145489 A1 | 6/2010 | Esser et al. |
| 2011/0267576 A1 | 11/2011 | Kratzer et al. |
| 2017/0131567 A1 | 5/2017 | To et al. |
| 2017/0363883 A1 | 12/2017 | Fricker et al. |
| 2019/0033619 A1 | 1/2019 | Neitz et al. |
| 2020/0073147 A1 | 3/2020 | Bakaraju et al. |

FOREIGN PATENT DOCUMENTS

| | | |
|---|---|---|
| CN | 105283301 B | 10/2017 |
| CN | 111095083 A | 5/2020 |
| EP | 2 115 527 B1 | 4/2014 |
| EP | 2 383 603 B1 | 9/2014 |
| EP | 3 532 891 A1 | 9/2019 |
| EP | 3 553 594 A1 | 10/2019 |
| EP | 3 561 578 A1 | 10/2019 |
| JP | 2010-503029 A | 1/2010 |
| JP | 4476995 B2 | 3/2010 |
| JP | 2019-529968 A | 10/2019 |
| JP | 2020-500328 A | 1/2020 |
| SG | 150829 A1 | 4/2009 |
| WO | 2007/082268 A2 | 7/2007 |
| WO | 2008031166 A1 | 3/2008 |
| WO | 2010/075319 A2 | 7/2010 |
| WO | 2015147758 A1 | 10/2015 |
| WO | 2018/026697 A1 | 2/2018 |
| WO | 2018/076057 A1 | 5/2018 |
| WO | 2019106399 A1 | 6/2019 |
| WO | 2019/152438 A1 | 8/2019 |
| WO | 2019/166653 A1 | 9/2019 |
| WO | 2019/166654 A1 | 9/2019 |
| WO | 2019/166655 A1 | 9/2019 |
| WO | 2019/166657 A1 | 9/2019 |
| WO | 2019/166659 A1 | 9/2019 |
| WO | 2019/206569 A1 | 10/2019 |
| WO | 2020/014613 A1 | 1/2020 |
| WO | 2020/113212 A1 | 6/2020 |
| WO | 2020180817 A1 | 9/2020 |

OTHER PUBLICATIONS

Office Action by the European Patent Office (EPO) issued in EP 22 185 279.1, which is a counterpart hereof, mailed on Aug. 8, 2023 (in the English language).
Koeppen, "Conception and development of progressive lenses," Deutsche Optikerzeitung DOZ Oct. 1995, pp. 42 to 46, 1995.
Industrial Norm "Ophthalmic optics—Spectacle lenses—Vocabulary (ISO 13666:2019)," English version EN ISO 13666:2019.
European Search Report issued in EP 20211634.9 on May 11, 2021, to which this application claims priority.
1st Office Action by the European Patent Office (EPO) issued in EP 20211634.9 on Dec. 2, 2021, to which this application claims priority.
2nd Office Action by the European Patent Office (EPO) issued in EP 20211634.9 on May 18. 2022, to which this application claims priority.
3rd Office Action by the European Patent Office (EPO) issued in EP 20211634.9 on Oct. 25, 2022, to which this application claims priority.
Intention to grant European patent application EP 20211634.9 issued on Feb. 8, 2023.
International Preliminary Report on Patentability issued in PCT/EP2021/083245, to which this application claims priority, mailed May 30, 2023.
Office Action by the Canadian Patent Office (CIPO) issued in CA 3,200,118, which is a counterpart hereof, mailed on Jul. 19, 2023.
Office Action by the Chinese Patent Office (CIPO) issued in CN 202180079350.X, which is a counterpart hereof, mailed on Jan. 11, 2024 and English translation thereof.
Notice of Opposition issued in EP 20 211 634.9, to which this application claims priority, mailed on Apr. 11, 2024.
Office Action by the Japanese Patent Office (JPO) issued in JP 2023-116592, which is a counterpart hereof, mailed on May 7, 2024, and English-language translation thereof.
Office Action by the Canadian Patent Office (CIPO) issued in CA 3,200,118, which is a counterpart hereof, mailed on Sep. 19, 2023.
Office Action by the Korean Patent Office (KIPO) issued in KR 10-2023-7018613, which is a counterpart hereof, mailed on Oct. 25, 2023 and English translation thereof.
Office Action by the European Patent Office (EPO) issued in EP 21 820 561.5, which is a counterpart hereof, mailed on Mar. 22, 2024 (in the English language).
Office Action by the Korean Patent Office (KIPO) issued in KR 10-2023-702481, which is a counterpart hereof, mailed on Feb. 24, 2025 and English-language translation thereof.
Office Action by the Japanese Patent Office (JPO) issued in JP 2023-116592, which is a counterpart hereof, mailed on May 7, 2025 and English-language translation thereof.
Office Action by the Chinese Patent Office (CIPO) issued in CN 202311086910.1, which is a counterpart hereof, mailed on Jul. 23, 2025 and English translation thereof.
Office Action by the European Patent Office (EPO) issued in EP 21 820 561.5, which is a counterpart hereof, mailed on Oct. 16, 2025.
Office Action by the Canadian Patent Office (CPO) issued in CA 3,226,143, which is a counterpart hereof, mailed on Oct. 23, 2025.
Decision to refuse by the Japanese Patent Office (JPO) issued in JP 2023-116592, which is a counterpart hereof, mailed on Nov. 4, 2025 and English-language translation thereof.

SPECTACLE LENS DESIGN, SPECTACLE LENS KIT AND METHOD OF MANUFACTURING A SPECTACLE LENS

CROSS REFERENCE TO RELATED APPLICATIONS

This application is a continuation application of U.S. patent application Ser. No. 18/319,133 filed on May 17, 2023 which is a continuation application of international patent application PCT/EP2021/083245, filed on Nov. 26, 2021, designating the United States and claiming priority from European patent application EP 20211634.9, filed on Nov. 26, 2020, and the entire content of all applications is incorporated herein by reference.

TECHNICAL FIELD

The present disclosure relates to a spectacle lens design for myopia control and to a spectacle lens kit. In addition, the disclosure relates to a computer-implemented method of designing a spectacle lens and a method of manufacturing a spectacle lens.

BACKGROUND

The prevalence of myopia (short sightedness) is increasing rapidly. Myopia significantly increases the risk of retinal detachment, (depending on the level of myopia), posterior cataract, and glaucoma. The optical, visual, and potential pathological effects of myopia and the resulting inconvenience and cost to the individual and community, make it desirable to have effective strategies to slow the progress, or prevent or delay the onset of myopia, or limit the amount of myopia occurring in both children and young adults.

WO 2010/075319 A2 also refers to the importance of peripheral retinal image determining myopic eye growth. The document proposes a therapeutic treatment method for preventing, ameliorating, or reversing eye-length-related disorders, the therapeutic treatment method comprising: identifying, in a patient, an eye-length-related disorder; and inducing artificial blurring of the patient's peripheral vision in order to decrease an average spatial frequency of images input to the retina of the eye past a threshold spatial frequency to inhibit further lengthening of the patient's eye. In particular, the document proposes providing the patient with spectacle lenses having a zone including a plurality of elements selected from the group consisting of: (i) bumps on a surface of the spectacle lens; (ii) depressions on the surface of the spectacle lens; (iii) first translucent inclusions in a spectacle lens material; and (iv) first transparent inclusions in the spectacle lens material, the first transparent inclusions having a refractive index different from that of the spectacle lens material. The elements in general are point-shaped elements having a non-zero point density in a range between 0 and 8 dots per $mm^2$. The spectacle lens has another zone that is surrounded by the zone including the plurality of elements and that provides clear vision.

Improvements of this kind of spectacle lenses are disclosed in WO 2018/026697 A1, WO 2019/152438 A1, and WO 2020/014613 A1, respectively.

In particular, WO 2018/026697 A1 discloses spectacles, comprising: a frame and a pair of spectacle lenses mounted in the frame, the spectacle lenses comprising a point pattern distributed across each spectacle lens, the point pattern comprising an array of dots spaced apart by a distance of 1 mm or less, each point having a maximum dimension of 0.3 mm or less.

WO 2019/152438 A1 discloses a spectacle lens, comprising: a lens material having two opposing curved surfaces; and a scattering region surrounding a clear aperture, wherein the scattering region has a plurality of spaced apart scattering centers sized and shaped to scatter incident light, the scattering centers being arranged in a pattern that includes an irregular variation in spacing between adjacent scattering centers and/or an irregular variation in scattering centers size.

Myopia-reducing spectacles such as they are for example disclosed in WO 2019/152438 A1 are composed of a spectacle frame and spectacle lenses mounted in the spectacle frame. Generally, the spectacle lenses can be plano lenses, single vision lenses (e.g., with positive or negative power) or multivision lenses (e.g., bifocals or progressive lenses). The spectacle lenses each have a clear zone surrounded by a zone providing a reduced-contrast. The clear zones are positioned to coincide with the wearer's on-axis viewing position, while the zones providing the reduced contrast correspond to the wearer's peripheral vision. The zones providing the reduced contrast are composed of an array of dots which reduce the contrast of an object in the wearer's peripheral vision by scattering light passing through those zones to the wearer's eye. In general, dots can be provided by forming protrusions and/or recesses on one or both surfaces of a spectacle lens and/or by forming scattering inclusions in the lens material itself in these zones.

Hong Kong Polytechnic University and Hoya recently disclosed spectacle lenses of similar structure in U.S. 2017/0131567 A1, namely those having bumps on a surface of the spectacle lens. These spectacle lenses are known as MSMD (multi segment myopic defocus) lenses. The respective technical concept is known as D.I.M.S. (Defocus Incorporated Multiple Segments) technology. Details are, for example, disclosed under the link www.hoyavision.com/en-hk/discover-products/for-spectacle-wearers/special-lenses/myosmart/. Respective spectacle lenses are disclosed in U.S. 2017/0131567 A1. Embodiments of these spectacle lenses shall suppress the progress of myopia while correcting myopia. A spectacle lens of such an embodiment is a meniscus concave lens with a front surface formed as a convex curved surface that is curved toward an object side, and a back surface formed into a concave surface having a larger curvature than the curvature of the front surface. In addition, the spectacle lens has a first zone in the center of the spectacle lens, the first zone having a first refractive power based on a prescription for correcting myopia, and a second zone that surrounds the first zone and includes a plurality of respectively independent island-shaped areas. The front surface of each of the island-shaped area in the second zone is formed into a convex spherical surface shape toward the object side having a larger curvature than the curvature of the front surface of the first zone. Thus, the refractive power of the independent island-shaped areas in the second zone is larger than the refractive power of the first zone by 2.00 dpt. to 5.00 dpt. Accordingly, an image is focused on a retina of an eye by the first zone is focused on a point in front of the retina by the island-shaped areas in the second zone.

Each island-shaped area covers about 0.50 to 3.14 $mm^2$ of the spectacle lens and has a circular shape having a diameter of about 0.8 to 2.0 mm. The plurality of island-shaped areas is approximately evenly arranged in the vicinity of the first zone in a way to be separated from each other by a distance almost equal to a value of a radius of an of island-shaped area.

A similar approach is used in Essilor's Stellest spectacle lenses being described in detail in EP 3 553 594 A1, EP 3 561 578 A1, WO 2019/166653 A1, WO 2019/166654 A1, WO 2019/166655 A1, WO 2019166657 A1, WO 2019/166659 A1, and WO 2019/206569 A1, respectively. The spectacle lenses described therein comprise microlenses/lenslets which are aspherical and have an optical power in their geometric center which lies in the range between 2.0 dpt and 7.0 dpt in absolute value, and an optical power in their periphery which lies in the range between 1.5 dpt and 6.0 dpt in absolute value. The refractive optical power provided by the aspherical microlenses/lenslets exceeds the refractive power of a clear central zone of the spectacle lenses by 0.5 dpt or more.

Also WO 2020/014613 A1 assigned to Sightglass Vision Inc. recently disclosed a myopia control spectacle lens that may contain one or more defocus elements, i.e., a myopia control spectacle lens may contain a clear center zone, free of the defocus elements treating children having, or suspected of having, myopia by having the children wear spectacles with myopia control lenses provides a safe, efficient, and non-invasive method for reducing the progression of juvenile myopia. Exemplarily, the document refers to regions that comprise island-shaped lenses.

Some wearers of spectacle lenses having a central clear zone surrounded by a zone providing a reduced-contrast as disclosed in WO 2019/152438 A1 or by a zone with microlenses/lenslets as disclosed in WO 2019/206569 A1 report of some kind of discomfort in use. In particular, zones of such spectacle lens may appear dirty.

WO 2018/076057 A1 discloses a spectacle lens design including a zone providing a focused image on the fovea which is surrounded by a zone with focusing structures for generating a myopic defocus. The width of the zone providing the focused image is considerably larger than its height.

WO 2020/113212 A1 discloses a spectacle lens design including a zone providing a focused image on the fovea that is surrounded by a zone with focusing structures for generating a myopic defocus or by diffusing zone. The width of the zone providing the focused image may be up to five times its height.

SUMMARY

It is a first objective of the present disclosure to provide a spectacle lens kit with a spectacle lens design, as well as a spectacle lens design similar to the lens designs described above, that is particularly suitable for reading tasks, and typically also provides a high comfort for a wearer of a respective spectacle lens.

It is a second objective of the present disclosure to provide a computer-implemented method of designing a spectacle lens similar to the lenses described in WO 2020/113212 A1 that is particularly suitable for reading tasks, and a method of manufacturing (in particular according to the design) a spectacle lens similar to the lenses described in WO 2020/113212 A1 that is particularly suitable for reading tasks, and typically also provides high comfort for a wearer of a respective spectacle lens.

The first objective is achieved by a spectacle lens kit and a spectacle lens design having a first zone with a focal power that provides a focused image on the fovea and a second zone with a plurality of focusing structures resulting in myopic defocus of with diffusing structures, and the second objective is achieved by the computer-implemented method of designing such a spectacle lens kit and spectacle lens and a method of manufacturing such a spectacle lens. Exemplary embodiments of the disclosure are discussed in detail below.

The following definitions are used within the scope of the present description:

Additional Power

In the context of the present specification, the term "additional power" applies to a focal power that is added to the focal power of a spectacle lens, where the focal power of a spectacle lens provides, assisted by accommodation, a focused image on the fovea and the additional power, when added to the focal power of a spectacle lens, provides for a myopic defocus. The additional power must not be confused with the addition power of a progressive addition lens. The addition power of a progressive addition lens, on the other hand, specifies the difference between the vertex power in the near portion of the spectacle lens and in the distance portion of the spectacle lens.

Aperture

In the context of the present specification, the term "aperture" applies to a zone of a spectacle lens that is surrounded by (i) a zone comprising diffusing structures such as scattering centers or (ii) a zone comprising structures providing an additional power or a plurality of additional powers.

As-Worn Position

The as-worn position is the position, including orientation, of the spectacle lenses relative to the eyes and face during wear (DIN ISO 13666:2019, section 3.2.36). The as-worn position is determined by the as-worn pantoscopic angle, the as-worn face form angle and the vertex distance. The as-worn pantoscopic angle is the vertical angle between the horizontal and the perpendicular to a reference line passing through the apex of the grooves of the upper and lower rims of the frame in the vertical plane containing the primary direction (DIN ISO 13666:2019, section 3.2.37), where the primary direction is the direction of the line of sight, usually taken to be the horizontal, to an object at an infinite distance measured with habitual head and body posture when looking straight ahead in unaided vision (DIN ISO 13666:2019, section 3.2.25) and the line of sight is the ray path from the point of interest (i.e., point of fixation) in object space to the center of the entrance pupil of the eye and its continuation in image space from the center of the exit pupil to the retinal point of fixation (generally the foveola) (DIN ISO 13666:2019, section 3.2.24). Typical values of the as-worn pantoscopic angle lie in the range between −20 and +30 degree. The as-worn face form angle is the horizontal angle between the primary direction and the perpendicular to a reference line passing through the apex of the grooves of the nasal and temporal rims of the frame in the horizontal plane containing the primary direction (DIN ISO 13666: 2019, section 3.2.38). Typical values of the as-worn face form angle lie in the range between −5 and +30 degree. The vertex distance is the horizontal distance between the back surface of the spectacle lens and the apex of the cornea, measured with the eyes in the primary position (DIN ISO 13666:2019, section 3.2.40), where the primary position is the position of the eye when looking in the primary direction (DIN ISO 13666:2019, section 3.2.26). Typical valued of the vertex distance lie in the range between 5 mm and 30 mm. The as-worn position may be an individual as-worn position determined for a specific individual or a generic as-worn position determined for a defined group of wearers.

Without reference to an as-worn position, the optical power to be achieved with a spectacle lens design would be ill defined. Moreover, as the information about the as worn position is necessary to define the optical power to be achieved with a spectacle lens design, and thus to define the technical effect to be achieved by the spectacle lens design, the information about the as worn position makes a technical contribution to the spectacle lens design.

Clear Zone

In the context of the present specification, the term "clear zone" applies to a zone of a spectacle lens design or a spectacle lens that provides neither a myopic defocus nor a diffusion in foveal vision when a wearer looks through the clear zone with the spectacle lens being positioned according to the specified as-worn position. Furthermore, at least a section of the clear zone allows for achieving, if necessary assisted by accommodation, a focused image on the fovea. For example, there may be zones of a spectacle lens design or a spectacle lens that do neither provide a myopic defocus nor a diffusion in foveal vision when a wearer looks through the respective zone but show a residual astigmatic error leading to a blurred image. Such a zone may be regarded as a clear zone in the meaning used in the present specification. In this example, only a section of the clear zone would allow for achieving a focused image on the fovea. In other examples of the clear zone, the region allowing for achieving a focused image on the fovea may extend over the whole clear zone.

Data Carrier Signal

A data carrier signal is a pulse or a series of pulses of electricity or light that represents data as it travels over a wired or wireless network.

Defining a Zone by at Least Partly Surrounding it

In the context of the present disclosure "defining a zone by at least partly surrounding it" means that the limits of a zone of a spectacle lens or a spectacle lens design are given by its boundary to another zone surrounding the zone as far as the limits of the zone are not given by the rim of a spectacle lens or the spectacle lens design.

Diffuser

In optics, a diffuser (also called a light diffuser or optical diffuser) is an optical element that is made of any material that diffuses or scatters light in some manner to transmit soft light. Diffuse light can be easily obtained by reflecting light from a white surface, while more compact diffusers may use translucent material, including ground glass, Teflon, holographs, opal glass, and greyed glass. Scattering may be achieved by scattering centers which may be point-shaped, examples of which are, e.g., disclosed in WO 2010/075319 A2, WO 2018/026697 A1, WO 2019/152438 A1 and WO 2020/014613 A1, respectively. Scattering centers may also be line-shaped. In the following the term "diffusing" comprises as a special case the term "scattering."

Diffusing Structure

The term "diffusing structure" means any structure providing diffusing properties to the respective area of the spectacle lens.

Focal Power

The term "Focal power" is a collective term for the spherical vertex power, which brings a paraxial pencil of parallel light to a single focus (and which is usually considered in the prescription by the "sphere" value or, abbreviated, "sph," and the cylindrical vertex power of a spectacle lens, which brings a paraxial pencil of parallel light to two separate line foci mutually at right angles (DIN ISO 13666: 2019, section 3.10.2) and which is usually considered in the prescription by the "cylinder" value or, abbreviated, "cyl."

The "vertex power" is the reciprocal of the paraxial vertex focal length (DIN ISO 13666:2019, section 3.10.7). Within the scope of the present description, a beam is to be considered to be a paraxial pencil of rays if its diameter does not exceed 0.05 mm, in particular 0.01 mm.

Focusing Structures

In the context of the present specification, the term "focusing structures" applies to structures providing a focus or a plurality of foci. In particular, such a focusing structure may comprise a microlens, a lenslet, a bump, etc. as described above with reference to the related art.

Fovea

The term "fovea" is used in the present description to denominate the fovea centralis, which is a central pit of the retina with densely packed photoreceptor cells.

Height

The term "height" refers to the maximum vertical dimension of a structure, in particular the maximum vertical dimension of a zone of a spectacle lens or a spectacle lens design in a predetermined as-worn position. This means in particular in case of a curved structure the difference between the highest point of the structure and the lowest point of the structure.

Myopic Defocus and Peripheral Myopic Defocus

The term "myopic defocus" refers to a situation in which light focuses in front of the fovea by such a distance that a focused image on the fovea cannot be achieved, even when assisted by accommodation. A peripheral myopic defocus is a myopic defocus that is present outside the visual field outside the fovea.

Nasal Segment

In the present description, the term "nasal segment" stands for a segment of a spectacle lens or a segment of a zone of a spectacle lens which is located closer to the nasal rim than to the temporal rim of a spectacle lens or for a segment of a spectacle lens design or a segment of a zone of a spectacle lens design that corresponds to a nasal segment of a spectacle lens manufactured according to the spectacle lens design.

Off-Center

The term "off-center" is used to describe that the geometric center of a structure of a spectacle lens or a spectacle lens design, such as for example an aperture, does not coincide with the penetration point of a defined visual ray through the spectacle lens or the spectacle lens design. The defined visual ray may in particular be the center ray of the bundle of rays which penetrates the spectacle lens or the spectacle lens design when reading while looking straight ahead at the reading target. The term "off-center shift" denotes the dimension by which the geometric center of the structure is off-set from the penetration point of the defined visual ray Prescription The term "prescription" denotes a summary in which the dioptric powers necessary for correcting a diagnosed refractive error are specified in the form of suitable values. In the case of spherical power, the prescription may contain a value "sph" for sphere. In the case of astigmatic power, the prescription can contain values "cyl" for cylinder and "axis" for axis, and, in the case of prismatic power, the prescription can contain prism and base values. Moreover, the prescription may contain further values, for example the "add" value in the case of multifocal spectacle lenses, the "add" value specifying the difference between the vertex power in the near portion of the spectacle lens and in the distance portion of the spectacle lens. A value "PD" for the interpupillary distance may also be contained in the prescription.

Primary Direction

The term "primary direction" means the direction of the line of sight, usually taken to be the horizontal, to an object at an infinite distance measured with habitual head and body posture when looking straight ahead in unaided vision (DIN ISO 13666:2019, section 3.2.25).

Representation of a Spectacle Lens Design

In the context of the present disclosure, the expression "representation of a spectacle lens design" refers to an implementation of a spectacle lens having the respective design features (physical representation of the spectacle lens design) or to a numerical data set describing the design features (numerical representation of the spectacle lens design). For example, such a data set may be stored in a memory of a computer or on a computer-readable (particularly non-transitory) storage medium. In addition, the data set may be retrievable from a data network like, for example, the internet or a local area network (LAN). A dataset resembling a representation of a progressive spectacle lens design may include, in particular, a description of the geometric shape and the medium of the progressive spectacle lens. Such a description can e.g., include a mathematical description of the front surface, the rear surface, the arrangement of these surfaces in relation to one another (including the thickness) and the edge delimitation of the progressive spectacle lens as well as the refractive index distribution of the medium of which the progressive lens is to be made. The representation can be in coded or even in encrypted form. The term medium here means the material (s) or the substance the spectacle lens is made of.

The representation of the progressive spectacle lens design may in addition or alternatively include computer-readable instructions for controlling one or more manufacturing machines (e.g., casting, grinding, milling, lapping and/or polishing machines) in order to produce a spectacle lens having the respective design features.

Semi-Finished Blank

The term "semi-finished blank" refers to a piece of optical material with one optically finished surface for the making of a spectacle lens (DIN ISO 13666:2019, section 3.8.1)

Segment of a Zone

In the present specification, the term "segment" is used in the context of a zone of a spectacle lens or a spectacle lens design to denominate a portion of the zone which represents an area of the zone which is smaller than the total area of the zone.

Spectacle Lens

A spectacle lens is an ophthalmic lens worn in front of, but not in contact with, the eyeball (DIN ISO 13666:2019, section 3.5.2), where an ophthalmic lens is a lens intended to be used for purposes of measurement, correction and/or protection of the eye, or for changing its appearance (DIN ISO 13666:2019, section 3.5.1).

The term "uncut spectacle lens" (DIN ISO 13666:2019, section 3.8.8) is a finished lens (3.8.7) prior to edging (3.8.10). A "cut spectacle lens" is therefore a finished lens after edging.

The present disclosure refers to both "uncut" and "cut spectacle lenses" and the respective designs, since the position of wear may be determined based on respective markings as defined in sec. 3.15.25 of the standard (see DIN ISO 13666:2019, section 3.9 for measurement purposes). However, the position of wear may be derived also from the rim contour of a "cut spectacle lens."

Spectacle Lens Design

The term optical spectacle lens design is used to denominate the calculated/predetermined or defined optical properties of a spectacle lens, typically for a predetermined specific wearer, taking into consideration a position/arrangement of the spectacle lens relative to a model of an eye of the wearer of the spectacle lens, a position/arrangement of a model of an object to be viewed by the wearer of the spectacle lens for a specific use condition of the spectacle lens as well as a model of the physiological visual properties of the wearer of the spectacle lens.

Particularly, the optical spectacle lens design may comprise a distribution of optical power across an effective area of a spectacle lens as perceived by a predetermined wearer of the spectacle lens for a predetermined as-worn position relative to the wearer's (model) eye and a predetermined object distance model. The calculation of the distribution of the optical power is based on the distance and orientation of the spectacle lens relative to the model eye, the distance and orientation of the spectacle lens relative to the model object as well as physiological parameters of the spectacle wearer such as the wearer's visual deficiencies, namely e.g., the wearer's ametropia, the wearer's ability to accommodate and the wearer's pupillary distance.

The term geometric spectacle lens design means the geometry of the spectacle lens providing the calculated optical properties of a spectacle lens described in the forgoing for the spectacle wearer.

The term target optical spectacle lens design means, a draft optical spectacle lens design, the optical properties of which correspond to or are equal to target optical properties. The term actual optical spectacle lens design means calculated optical properties of a spectacle lens being received as a result of an optimization process/calculation aiming to achieve the target optical spectacle lens design as close as possible. Such an optimization process/calculation in particular for progressive spectacle lenses or customized single vision lenses is e.g., disclosed in Werner Köppen: "Konzeption and Entwicklung von Progressivgläsern," in Deutsche Optiker Zeitung DOZ 10/95, S. 42-46.

Such optical or geometric spectacle lens designs may be stored on a computer-readable (e.g., non-transitory and/or electronic and/or optical) data carrier. Moreover, spectacle lenses manufactured according to the spectacle lens design can be considered physical representations of the spectacle lens design.

Essential steps of an example of a method for designing a spectacle lens are outlined in the following:

In a first step, individual user data or application data of the spectacle wearer are recorded. This includes the acquisition of (physiological) data that can be assigned to the spectacle wearer and the acquisition of usage conditions under which the spectacle wearer will wear the spectacles to be designed.

The physiological data of the spectacle wearer may include e.g., the wearer's ametropia and the wearer's ability to accommodate, which are determined by means of a refraction measurement and which are regularly included in a prescription in the form of prescription values for sphere, cylinder, axis, prism and base as well as addition. Furthermore, e.g., the pupillary distance and the pupil size were determined under different lighting conditions. The age of the wearer has an influence on the ability to accommodate and pupil size and may therefore also be taken into consideration. The convergence behavior of the eyes results from the pupillary distance for different viewing directions and object distances.

The conditions of use include the as-worn position of the spectacle lenses in front of the eye (usually in relation to the eye's pivot point) and the object distances for different viewing directions under which the spectacle wearer should see clearly. The seat of the spectacle lenses in front of the eye can e.g., be determined by recording the corneal vertex distance as well as anterior and lateral inclination. These data are included in an object distance model, for which a ray tracing method can be applied.

In a subsequent step, a draft design for the spectacle lens with a large number of evaluation points is determined on the basis of this recorded data. The draft design includes target optical properties for the spectacle lens at the respective evaluation point. The target properties include e.g., the permissible deviation from the prescribed spherical and astigmatic power, taking into account the addition, distributed over the entire spectacle lens, as specified by the arrangement of the lens in front of the eye and the underlying distance model.

Furthermore, a design of surface geometries for the front and back surfaces as well as a design for a refractive index distribution over the entire spectacle lens are specified. The front surface can be selected as a spherical surface and the back surface as a varifocal surface, for example. Both surfaces could also initially be selected as spherical surfaces. The choice of surface geometry for the first draft generally only determines the convergence (speed and success) of the optimization method used. It should be assumed, for example, that the front surface is to retain the spherical shape and the back surface is given the shape of a varifocal surface.

In a further step, the course of main rays is determined through the large number of evaluation points. Possibly, a local wavefront can be established for each of the main rays in a vicinity of the respective main ray. According to Werner Köppen: Design and Development of Progressive Lenses, in Deutsche Optiker Zeitung DOZ 10/95, pp. 42-46, the number of evaluation points is usually in the range between 1000 and 1500. EP 2 115 527 B1 suggests a number of over 8000 evaluation points. Although the refractive index is usually dependent on the wavelength, the dispersion is generally not taken into account and the calculation is carried out for a so-called design wavelength. However, it cannot be ruled out that an optimization process takes different design wavelengths into account, e.g., is described in EP 2 383 603 B1.

In a subsequent step, the above optical properties of the spectacle lens at the evaluation points are determined by determining an influence of the spectacle lens on the beam path of the main rays and, if necessary, the local wavefronts in the vicinity of the respective evaluation point.

In a further step, the design of the spectacle lens is evaluated depending on the determined optical properties and the individual user data. The back surface geometry and as the case may be the refractive index distribution of the design of the spectacle lens may be modified by minimizing a target function such as e.g., $$F = \sum_m P_m \sum_n W_n (T_n - A_n)^2$$

where $P_m$ represents the weighting at the evaluation point m, $W_n$ the weighting of the optical property n, $T_n$ the target value of the optical property n at the respective evaluation point m and $A_n$ denotes the actual value of the optical property n at the evaluation point m.

In other words, the local surface geometry of the back surface and as the case may be the local refractive index of the spectacle lens in the respective visual beam path are modified by the evaluation points until a termination criterion is met.

Surrounding a Zone

In the context of the present disclosure, "surrounding a zone" of a spectacle lens or a spectacle lens design means that all sides of a zone of the spectacle lens or the spectacle lens design which do not reach the rim of the spectacle lens or the spectacle lens design are enclosed.

Temporal Segment

In the present description, the term "temporal segment" stands for a segment of a spectacle lens or for a segment of a zone of a spectacle lens which is located closer to the temporal rim than to the nasal rim of a spectacle lens or for a segment of a spectacle lens design or for a segment of a zone of a spectacle lens design that corresponds to a temporal segment of a spectacle lens manufactured according to the spectacle lens design.

Viewing Angle

The term "viewing angle" refers to the angular distance between two points in the field of view.

Width

The term "width" referrers to the horizontal dimension of a structure, in particular the horizontal dimension of a zone of a spectacle lens or a spectacle lens design in a predetermined as-worn position. This means in particular in case of a curved structure the absolute value of the difference between the point of the structure which is located most nasal-wards and the point of the structure which is located most temporal-wards.

Zone of a Spectacle Lens

In the present specification, the term "zone" is used in the context of a spectacle lens or a spectacle lens design to denominate a portion of the spectacle lens or the spectacle lens design which represents an area of the spectacle lens or the spectacle lens design which is smaller than the total area of the spectacle lens or spectacle lens design.

According to a first aspect of the disclosure, a spectacle lens kit comprising a spectacle lens design for a spectacle lens to be positioned relative to the eye of a wearer according to a given as-worn position together with instructions including the as-worn position of the spectacle lens design relative to the wearer's eye and a predetermined object distance model are provided. The spectacle lens design includes a first zone which, when a spectacle lens manufactured according to the spectacle lens design is positioned according to the as-worn position, has a focal power that provides a focused image on the fovea, and at least one second zone at least partly surrounding the first zone where the second zone contains at least one of the following: (i) focusing structures providing a focal power resulting in a myopic defocus when a spectacle lens manufactured according to the spectacle lens design is positioned according to the as-worn position, i.e., positioned such that the focal power of the first zone provides a focused image on the fovea, or (ii) diffusing structure, such as e.g., scattering centers, leading to a diffusion of light passing the at least one second zone.

The first zone represents a clear area having a first refractive power that is typically based on a prescription for correcting an abnormal refraction of an eye. The second zone represents a diffuser or a zone providing a myopic defocus due to focusing structures each having a focal power obtained by adding a positive additional power to the focal power present in the first zone. The width of the first zone may be at least four times the height of the first zone and, in particular, at least six times height of the first zone.

In the inventive spectacle lens kit, the first zone is curved such as to follow the converging line of sight of the wearer upon reading. This can, for example, be achieved in that the first zone comprises a nasal segment, i.e., a segment located closer to the nasal rim than to the temporal rim of a spectacle lens manufactured according to the spectacle lens design, a temporal segment, i.e., a segment located closer to the temporal rim than to the nasal rim of a spectacle lens manufactured according to the spectacle lens design, and a central segment located between the nasal segment and the temporal segment. In this case, the curvature of the first zone may be achieved by a downwards shift of the nasal segment with respect to the central segment. Such a curvature corresponds to an up and down movement and convergence of the eye when the viewing direction changes vertically while reading a text. As a consequence, the shape of first zone of the present disclosure is well adapted to the eye movement when reading a text.

In addition to, or as an alternative to, shifting the nasal segment downwards with respect to the central segment, the temporal segment may be shifted downwards with respect to the central segment. Such a curvature may further correspond to an up and down movement of the eye when the viewing direction changes vertically while reading a text. As a consequence, the shape of first zone of the present exemplary embodiment is well adapted to the eye movement when reading a text.

In one option of the aforementioned aspect of the present disclosure the ratio of the width and the height of the first zone is predetermined such that at least one of the following conditions is fulfilled:
  a) the width of the first zone is at least three times the height of the first zone
  b) the width of the first zone being at least four times the height of the first zone
  c) the width of the first zone being at least five times the height of the first zone. The more the width of the first zone exceeds the height the more eye "undisturbed" movement is possible as well as the closer the spectacle lens can be worn to the eye.

In another option of this aspect of the present disclosure the ratio of the width and the height of the first zone is further specified and predetermined such that at least one of the following conditions is fulfilled:
  a) the height of the first zone being uniform along at least a part of the width of the first zone, where the uniform height of the first zone within the part is a value in the range between 3 mm and 5 mm, and where the part of the width is at least three times the uniform height,
  b) the height of the first zone being uniform along at least a part of the width of the first zone, where the uniform height of the first zone within the part is a value in the range between 3 mm and 5 mm, and where the part of the width is at least four times the uniform height,
  c) the height of the first zone being uniform along at least a part of the width of the first zone, where the uniform height of the first zone within the part is a value in the range between 4 mm and 5 mm, and where the part of the width is at least three times the uniform height,
  d) the height of the first zone being uniform along at least a part of the width of the first zone, where the uniform height of the first zone within the part is a value in the range between 4 mm and 5 mm, and where the part of the width is at least four times the uniform height.

If the width of first zone is at least four times larger than the height of the first zone, a wearer can clearly see a plurality of letters in a line when reading with a spectacle lens based on the inventive spectacle lens design even in case of first zone having a small height. In particular, if the width is at least six times the height even longer words can be seen clearly as a whole. With the inventive spectacle lens design a wearer of a spectacle lens based on the spectacle lens design is not or at least less disturbed by zones of the spectacle lens appearing dirty. Hence, the discomfort of wearing myopia reducing spectacle lenses based on the inventive spectacle lens design is reduced as compared to myopia reducing spectacle lenses according to the state of the art while the myopia progression controlling functionality is maintained.

In an exemplary embodiment of the inventive spectacle lens design, the height of the first zone is chosen such that it covers a vertical viewing angle of 0.8 to 1.5 degree, typically 1.0 to 1.2 degree and in particular 1.0 degree or 1.2 degree, when a spectacle lens manufactured according to the inventive spectacle lens design is positioned according to the as-worn position, i.e., positioned such that the focal power of the first zone provides a focused image on the fovea. As typical letters with a size of 12 pt. approximately correspond to a vertical viewing angle of 1.0 degree this development allows a wearer of a spectacle lens based on the inventive spectacle lens design to clearly see a number of letters of a line of text while, at the same time, a large diffuser zone or a large zone providing a myopic defocus can be maintained for the myopia progression controlling functionality.

The height of the first zone may therefore be in a range between approximately 3 mm to 8 mm, while the width of the first zone may be in the range between approximately 12 mm up to the whole dimension of the spectacle lens in horizontal direction.

In the spectacle lens design of the inventive spectacle lens kit the width of the first zone my match the width of the spectacle lens design. In this case the second zone limits the first zone upwards and downwards but not nasal-wards and temporal-wards. Hence, the first zone is only partly surrounded by the second zone and the first zone divides the second zone in two distinct sub-zones. When the width of the first zone matches the width of the spectacle lens design the maximum reading comfort can be provided for a wearer of a spectacle lens manufactured according to the inventive lens design for each given height of the first zone.

The first zone of the spectacle lens design of the inventive spectacle lens kit may be located off-center with respect to the penetration point of the center ray of the bundle of rays which penetrates the spectacle lens design when reading while looking straight ahead at the reading target and shifted temporal-wards if the spectacle lens design is for a spectacle lens to be used for the right eye or the left eye and nasal-wards if the spectacle lens design is for a spectacle lens to be used for the respective other eye. If the first zone is shifted temporal-wards if the spectacle lens design is for a spectacle lens to be used for the right eye the spectacle lenses are adapted to an eye movement when reading from left to right. If, on the other hand, the first zone is shifted temporal-wards if the spectacle lens design is for a spectacle lens to be used for the left eye the spectacle lenses are adapted to reading direction from right to left. A spectacle lens design that is in this way adapted to the eye movement when reading leads to more comfort when reading.

The off-center shift (e.g., to the right direction for reading tasks from left to right) may exceed 0.5 cm, typically 0.6 cm, more typically 0.7 cm or even more than 0.8 cm. However, the off-center shift typically does not exceed 1.5 cm. Typically, the off-center shift may be between 0.5 and 1.2 cm.

According to the first aspect of the disclosure, also a data set comprising at least one kind of the following kinds of data is provided: (i) a numerical representation of the spectacle lens design according to the first aspect of the disclosure, and (ii) data containing computer-readable instructions for controlling one or more manufacturing machines in order to produce a spectacle lens according to the spectacle lens design according to the first aspect of the disclosure. Such a data set can be used in a computer numerically controlled manufacturing process to manufacture a spectacle lens based on the spectacle lens design.

According to the first aspect of the disclosure, also a data carrier signal carrying at least one kind of the following kinds of data is provided: (i) a numerical representation of the spectacle lens design according to a spectacle lens kit according to the first aspect of the disclosure, and (ii) data containing computer-readable instructions for controlling one or more manufacturing machines in order to produce a spectacle lens according to the spectacle lens design according to the first aspect of the disclosure. Such a data carrier signal may, e.g., be provided by a cloud server via a network and can be used in a computer numerically controlled manufacturing process to manufacture a spectacle lens based on the spectacle lens design.

According to a second aspect of the disclosure, a computer-implemented method of designing and a method of manufacturing a spectacle lens to be positioned relative to the eye of a wearer according to a given as-worn position is provided. The methods include the steps of providing a numerical representation of a spectacle lens or a spectacle lens with a focal power that provides a focused image on the fovea when the spectacle lens is positioned according to an as-worn position, and designing in the numerical representation of a spectacle lens a zone with at least one of (i) focusing structures providing a focal power resulting in a myopic defocus when the spectacle lens is positioned according to the as-worn position or (ii) diffusing structures, such as e.g., scattering centers, leading to a diffusion of light, or forming in a zone of the spectacle lens at least one of (i) focusing structures providing a focal power resulting in a myopic defocus when the spectacle lens is positioned according to the as-worn position or (ii) diffusing structures, such as e.g., scattering centers, leading to a diffusion of light, where the zone is formed as a second zone that defines, by at least partly surrounding it, a first zone having the focal power that provides a focused image on the fovea when the spectacle lens is positioned according to an as-worn position.

According to the disclosure, the second zone is designed such in the numerical representation of a spectacle lens or formed such in the spectacle lens that the first zone defined by the at least partly surrounding second zone is curved such as to follow the converging line of sight of the wearer upon reading. This may be achieved by designing or forming the second zone such that the first zone comprises a nasal segment, i.e., a segment located closer to the nasal rim than to the temporal rim of the spectacle lens to be manufactured, a temporal segment, i.e., a segment located closer to the temporal rim than to the nasal rim of the spectacle lens to be manufactured, and a central segment located between the nasal segment and the temporal segment. In this case, the curvature of the first zone may be achieved by a downwards shift of the nasal segment and/or the temporal segment with respect to the central segment. Such a curvature corresponds to an up and down movement of the eye when the viewing direction changes vertically while reading a text. As a consequence, the shape of first zone of the present disclosure is well adapted to the eye movement when reading a text.

In an inventive spectacle lens designed or manufactured according to the inventive method, the first zone represents a clear area having a first refractive power that is typically based on a prescription for correcting an abnormal refraction of an eye. The second zone represents a diffuser or a zone providing a myopic defocus due to focusing structures each having a focal power obtained by adding a positive additional power to the focal power present in the first zone. If in a spectacle lens designed or manufactured according to the inventive method the width of first zone is at least four times larger than the height of the first zone, a wearer can clearly see a plurality of letters in a line when reading with the spectacle lens even in case of first zone has a small height. In particular, if the width is at least six times the height even longer words can be seen clearly as a whole. With the spectacle lens designed in this way a wearer of such a spectacle lens is not or at least less disturbed by zones of the spectacle lens appearing dirty. Hence, the discomfort of wearing myopia reducing spectacle lenses manufactured according to the inventive method is reduced as compared to myopia reducing spectacle lenses according to the state of the art while the myopia progression controlling functionality is maintained.

The second zone may be designed or formed such that the first zone defined by the at least partly surrounding second zone has such dimensions as to cover a vertical viewing angle of 0.8 to 1.5 degree when a spectacle lens is positioned according to the as-worn position. In particular, the second zone may be designed or formed such that the first zone defined by the at least partly surrounding second zone has such dimensions as to cover a vertical viewing angle of 1.0 to 1.2 degree, for example 1.0 degree or 1.2 degree. As typical letters with a size of 12 pt. approximately correspond to a vertical viewing angle of 1.0 degree such a first zone allows a wearer of a spectacle lens manufactured according to the inventive method to clearly see a number of letters of a line of text while, at the same time, a large diffuser zone or a large zone providing a myopic defocus can be maintained for the myopia progression controlling functionality.

In an exemplary embodiment of the inventive method, the second zone is designed or formed such that the first zone defined by the at least partly surrounding second zone has a width that matches the width of the spectacle lens. In this case the second zone limits the first zone upwards and downwards but not nasal-wards and temporal-wards. Hence, the first zone is only partly surrounded by the second zone and the first zone divides the second zone in two distinct sub-zones. When the width of the first zone matches the width of the spectacle lens the maximum reading comfort can be provided for a wearer of the spectacle lens for each given height of the first zone. In this development, the second zone surrounding the first zone has distinct sub-zones.

In a further exemplary embodiment of the inventive method, the second zone is designed or formed such that the geometric center of the first zone defined by the at least partly surrounding second zone is located at least vertically off-center with respect to the penetration point of the center ray of the bundle of rays which penetrates the spectacle lens when reading while looking straight ahead at the reading target. The first zone is shifted temporal-wards if the spectacle lens is to be used for the right eye or the left eye and nasal-wards if the spectacle lens is to be used for the respective other eye. If the first zone is shifted temporal-wards if the spectacle lens is to be used for the right eye the spectacle lenses are adapted to an eye movement when reading from left to right. If, on the other hand, the first zone is shifted temporal-wards if the spectacle lens design is for a spectacle lens to be used for the left eye the spectacle lenses are adapted to reading direction from right to left. A spectacle lens design that is in this way adapted to the eye movement when reading leads to more comfort when reading.

According to a third aspect of the disclosure, a spectacle lens design for a spectacle lens is provided which includes:

A first zone which provides a single focal power.

At least one second zone at least partly surrounding the first zone where the second zone contains at least one of the following: (i) focusing structures providing a focal power higher than the focal power of the first zone or (ii) diffusing structures leading to a diffusion of light passing the at least one second zone. The focal power of the focusing structures may be at least 0.5 dpt higher than the focal power of the first zone.

According to the third aspect of the disclosure, the first zone comprises a nasal segment, a temporal segment, and a central segment located between the nasal segment and the temporal segment, where at least one of the nasal segment and the temporal segment is shifted downwards with respect to the central segment. In particular, both of the nasal segment and the temporal segment may be shifted downwards with respect to the central segment. The shift provides for a curvature of the first zone which corresponds to an up and down movement and convergence of the eye when the viewing direction changes vertically while reading a text. As a consequence, the shape of first zone of the present disclosure is well adapted to the eye movement when reading a text. This effect is particularly prominent when both of the nasal segment and the temporal segment are shifted downwards with respect to the central segment.

In one option of this third aspect of the present disclosure the ratio of the width and the height of the first zone is predetermined such that at least one of the following conditions is fulfilled:

a) the width of the first zone is at least three times the height of the first zone b) the width of the first zone being at least four times the height of the first zone c) the width of the first zone being at least five times the height of the first zone.

The more the width of the first zone exceeds the height the more eye "undisturbed" movement is possible as well as the closer the spectacle lens can be worn to the eye.

In another option of this third aspect of the present disclosure the ratio of the width and the height of the first zone is further specified and predetermined such that at least one of the following conditions is fulfilled:

a) the height of the first zone being uniform along at least a part of the width of the first zone, where the uniform height of the first zone within the part is a value in the range between 3 mm and 5 mm, and where the part of the width is at least three times the uniform height, b) the height of the first zone being uniform along at least a part of the width of the first zone, where the uniform height of the first zone within the part is a value in the range between 3 mm and 5 mm, and where the part of the width is at least four times the uniform height, c) the height of the first zone being uniform along at least a part of the width of the first zone, where the uniform height of the first zone within the part is a value in the range between 4 mm and 5 mm, and where the part of the width is at least three times the uniform height, d) the height of the first zone being uniform along at least a part of the width of the first zone, where the uniform height of the first zone within the part is a value in the range between 4 mm and 5 mm, and where the part of the width is at least four times the uniform height.

The width of the first zone may, e.g., be at least four times the height of the first zone and, in particular, at least six times height of the first zone. Moreover, the width of the first zone may match the width of the spectacle lens design. If in a spectacle lens designed or manufactured according to the third aspect of inventive method the width of first zone is at least four times larger than the height of the first zone, a wearer can clearly see a plurality of letters in a line when reading with the spectacle lens even in case of first zone has a small height. In particular, if the width is at least six times the height or even matches the width of the spectacle lens design also longer words can be seen clearly as a whole. With the spectacle lens designed in this way a wearer of such a spectacle lens is not or at least less disturbed by zones of the spectacle lens appearing dirty. Hence, the discomfort of wearing myopia reducing spectacle lenses manufactured according to the inventive method is reduced as compared to myopia reducing spectacle lenses according to the state of the art while the myopia progression controlling functionality is maintained.

According to the third aspect of the disclosure, also a data set comprising at least one kind of the following kinds of data is provided: (i) a numerical representation of the spectacle lens design according to the third aspect of the disclosure, and (ii) data containing computer-readable instructions for controlling one or more manufacturing machines in order to produce a spectacle lens according to the spectacle lens design according to the third aspect of the disclosure. Such a data set can be used in a computer numerically controlled manufacturing process to manufacture a spectacle lens based on the spectacle lens design.

According to the third aspect of the disclosure, also a data carrier signal carrying at least one kind of the following kinds of data is provided: (i) a numerical representation of the spectacle lens design according to the third aspect of the disclosure, and (ii) data containing computer-readable instructions for controlling one or more manufacturing machines in order to produce a spectacle lens according to the spectacle lens design according to the third aspect of the disclosure. Such a data carrier signal may e.g., be provided by a cloud server via a network and can be used in a computer numerically controlled manufacturing process to manufacture a spectacle lens based on the spectacle lens design.

According to a fourth aspect of the disclosure, a computer-implemented method of designing and a method of manufacturing a spectacle lens are provided.

The computer-implemented method of designing a spectacle lens includes the steps of providing a numerical representation of a spectacle lens with a single focal power, and designing in the numerical representation of a spectacle lens a zone with at least one of (i) focusing structures providing a focal power higher than the focal power of the first zone or (ii) diffusing structures leading to a diffusion of light, where the zone is designed such as to form a second zone that defines by at least partly surrounding it a first zone having the focal power of the provided numerical representation of a spectacle lens. The second zone is designed such that the first zone comprises a nasal segment, a temporal segment, and a central segment located between the nasal segment and the temporal segment and that at least one of the nasal segment and the temporal segment is shifted downwards with respect to the central segment. In particular, the second zone may be designed such that both of the nasal segment and the temporal segment are shifted downwards with respect to the central segment.

The method of manufacturing a spectacle lens includes the steps of a spectacle lens with a single focal power, and forming in a zone of the spectacle lens at least one of (i) focusing structures providing a focal power higher than the focal power of the first zone or (ii) diffusing structures leading to a diffusion of light, where the zone is formed as a second zone that defines by at least partly surrounding it a first zone having the focal power of the provided spectacle lens. The second zone is formed such that the first zone comprises a nasal segment, a temporal segment, and a central segment located between the nasal segment and the temporal segment, where at least one of the nasal segment and the temporal segment is shifted downwards with respect to the central segment. In particular, the second zone may be formed such that both of the nasal segment and the temporal segment are shifted downwards with respect to the central segment.

The shift of the nasal segment and/or the temporal segment provides for a curvature of the first zone which corresponds to an up and down movement and convergence of the eye when the viewing direction changes vertically while reading a text. As a consequence, the shape of first zone of the present disclosure is well adapted to the eye movement when reading a text. This effect is particularly prominent when both of the nasal segment and the temporal segment are shifted downwards with respect to the central segment.

In the computer-implemented method of designing a spectacle lens as well as in the method of manufacturing a spectacle lens, the second zone may be designed or formed such that the first zone defined by the at least partly surrounding second zone has such dimensions as to cover a vertical viewing angle of 0.8 to 1.5 degree when the designed spectacle lens is positioned according to the as-worn position. In particular, the second zone may be designed or formed such that the first zone defined by the at least partly surrounding second zone has such dimensions as to cover a vertical viewing angle of 1.0 to 1.2 degree, for example 1.0 degree or 1.2 degree. As typical letters with a size of 12 pt. approximately correspond to a vertical viewing angle of 1.0 degree such a first zone allows a wearer to clearly see a number of letters of a line of text while, at the same time, a large diffuser zone or a large zone providing a myopic defocus can be maintained for the myopia progression controlling functionality.

Moreover, in the computer-implemented method of designing a spectacle lens as well as in the method of manufacturing a spectacle lens the second zone may be designed or formed such that the width of the first zone matches the width of the spectacle lens design. When the width of the first zone matches the width of the spectacle lens the maximum reading comfort can be provided for a wearer of the spectacle lens for each given height of the first zone.

Furthermore, in the computer-implemented method of designing a spectacle lens as well as in the method of manufacturing a spectacle lens the second zone may be designed such that geometric center of the first zone is located at least vertically off-center with respect to the penetration point of the center ray of the bundle of rays which penetrates the spectacle lens when reading while looking straight ahead at the reading target a and shifted temporal-wards if the designed spectacle lens is to be used for the right eye or the left eye and nasal-wards if the designed spectacle lens is to be used for the respective other eye. If the first zone is shifted temporal-wards if the spectacle lens is to be used for the right eye the spectacle lenses are adapted to an eye movement when reading from left to right. If, on the other hand, the first zone is shifted temporal-wards if the spectacle lens design is for a spectacle lens to be used for the left eye the spectacle lenses are adapted to reading direction from right to left. A spectacle lens design that is in this way adapted to the eye movement when reading leads to more comfort when reading.

Further developments of the spectacle lens design according to the third aspect may be the same as the further developments of the spectacle lens design according to the first aspect of the disclosure.

BRIEF DESCRIPTION OF THE DRAWINGS

Further features, properties and advantages of the present disclosure will become clear from the following description of exemplary embodiments of the disclosure in conjunction with the accompanying drawings.

DESCRIPTION OF EXEMPLARY EMBODIMENTS

Exemplary embodiments of spectacle lenses based on the inventive lens design will be described with respect to FIGS. 1 to 6. The spectacle lenses of the exemplary embodiments each include a first zone and second zone at least partly surrounding the first zone. The first zone is curved such as to follow the converging line of sight of the wearer upon reading.

In all exemplary embodiments, the width of the first zone is at least four times the height of the first zone while in some exemplary embodiments the first zone extends over the whole width of the spectacle lens, i.e., from the temporal rim of the spectacle lens to the nasal rim of the spectacle lens. In those exemplary embodiments in which the first zone extends over the whole width of the spectacle lens the second zone only partly surrounds the first zone and is divided into two separate sub-zones by the first zone. The exemplary embodiments also include such spectacle lenses in which the first zone is located off-center as well as such spectacle lenses in which the first zone is curved. However, the locations and the geometries of the first zones described in the exemplary embodiments are not exhaustive. A person skilled will envisage further possible locations and geometries in for first zones which have a width that is at least four times the height of the respective first zone.

Figure 1:
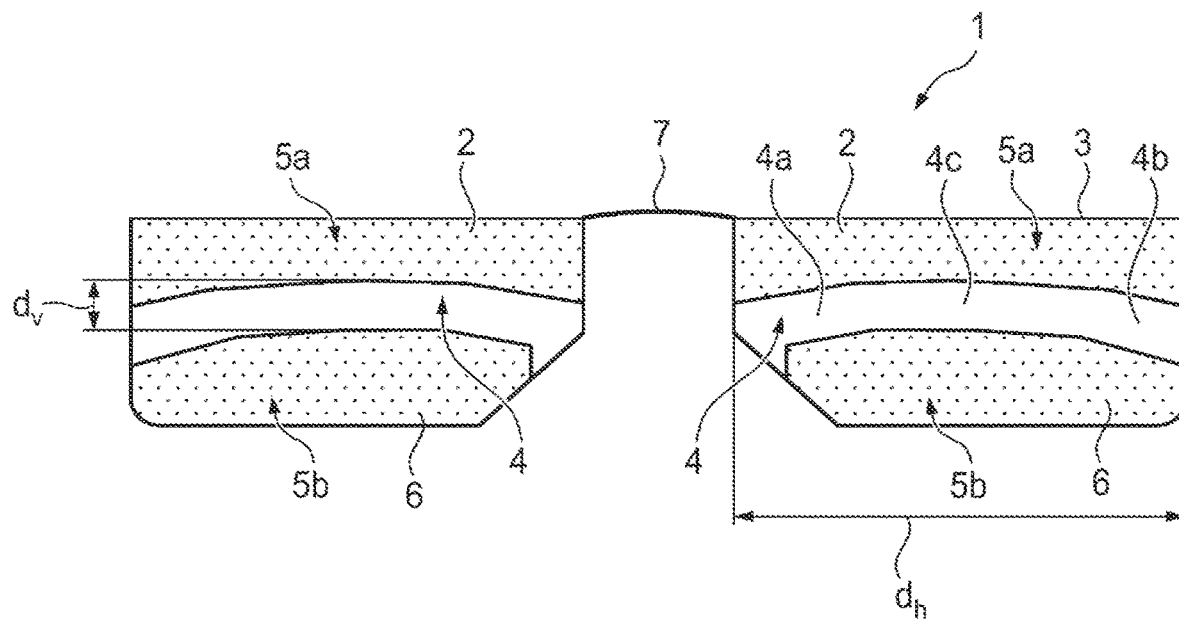
FIG. 1 shows an exemplary embodiment of a spectacle with a first zone with a width matching the width of the spectacle lens.

A first exemplary embodiment of the inventive spectacle lens design will be described with respect to FIG. 1 which shows spectacles 1 with spectacle lenses 2 manufactured according to the first exemplary embodiment of inventive spectacle lens design in a plan view. The spectacle lenses 2 can be regarded as representative for the spectacle lens design of the first exemplary embodiment.

In the present exemplary embodiment, the spectacles 1 comprise two single vision spectacle lenses 2, one for the right eye and one for left eye of the wearer. The two spectacle lenses 2 are mounted in a spectacle frame 3 and are separated by the bridge 7 of the spectacle frame 3. Due to the myopic wearer the spectacle lenses 2 are designed to provide full correction according to the wearer's prescription. The spectacle lenses 2 are therefore minus lenses.

Each of the spectacle lenses 2 includes a first zone 4 which resembles a clear zone for viewing objects. In other words, the first zone 4 provides for a clear image to the foveal zone of the retina of the wearer's eyes.

This first zone 4 extends over the whole width of the spectacle lens 2, i.e., over its whole dimension $d_v$ in vertical direction, and is surrounded in vertical direction by a second zone which, in the present exemplary embodiment, consists of two sub-zones zones 5a, 5b which are separated from each other by the first zone 4. The sub-zones zones 5a, 5b provide scattering optical properties. Therefore, the second zone of the present exemplary embodiment, i.e., its sub-zones 5a, 5b, forms a diffuser zone with two diffuser sub-zones. The sub-zones 5a, 5b of the second zone are stripe-shaped and comprise a plurality of dot-shaped scattering centers 6. Scattering in physics is generally understood to mean the deflection of an object through interaction with another local object, i.e., a scattering center. In the present case, scattering shall mean undirected arbitrary deflection of incoming light not resulting in a predetermined focus or in a plurality of predetermined foci but providing contrast reduction to the wearer as compared to viewing through the clear first zone 4.

In the present exemplary embodiment, the height of the first zone 4 is given by the vertical distance between the sub-zones 5a, 5b of the second zone and is chosen such that it allows for a vertical viewing angle of about 1.2 degree when the spectacle lenses 2 are worn according to the dedicated as-worn position. Such a viewing angle allows for clearly viewing a letter of 12 pt. Due to the fact that the first zone 4 extends over the whole width of the spectacle lens 2 clear sight of the letters in a line is not hindered by the second zone which increases comfort when reading as compared to the state of the art spectacle lenses with circular zones of clear sight as they are described, for example, in WO 2010/075319 A2, WO 2018/026697 A1, WO 2019/152438 A1 and WO 2020/014613 A1, respectively.

The first zone 4 includes a nasal segment 4a, i.e., a segment that is located towards the nasal rim 8 of the spectacle lens, a temporal segment 4b, i.e., a segment that is located towards the temporal rim 9 of the spectacle lens and a central segment 4c located between the nasal segment 4a and the temporal segment 4b. The first zone 4 is curved such that the nasal segment 4a and the temporal segment 4b are shifted downwards with respect to the central segment 4c. The curvature of the first zone 4 complies with the wearer's line of sight when reading a book at near distance when the wearer holds the book in a plane in front of him at a reading distance to the wearer's retina and he moves his eyes from left to right when reading a line of the book. With the curved first zone 4 it can be avoided that the contrast of a part of the currently read line reduces during the eye movement when reading a line due to the diffusing induced by the second zone 5a, even if the height of the first zone only allows for a vertical viewing angle that just allows for reading a letter in the size of 12 pt.

Figure 2:
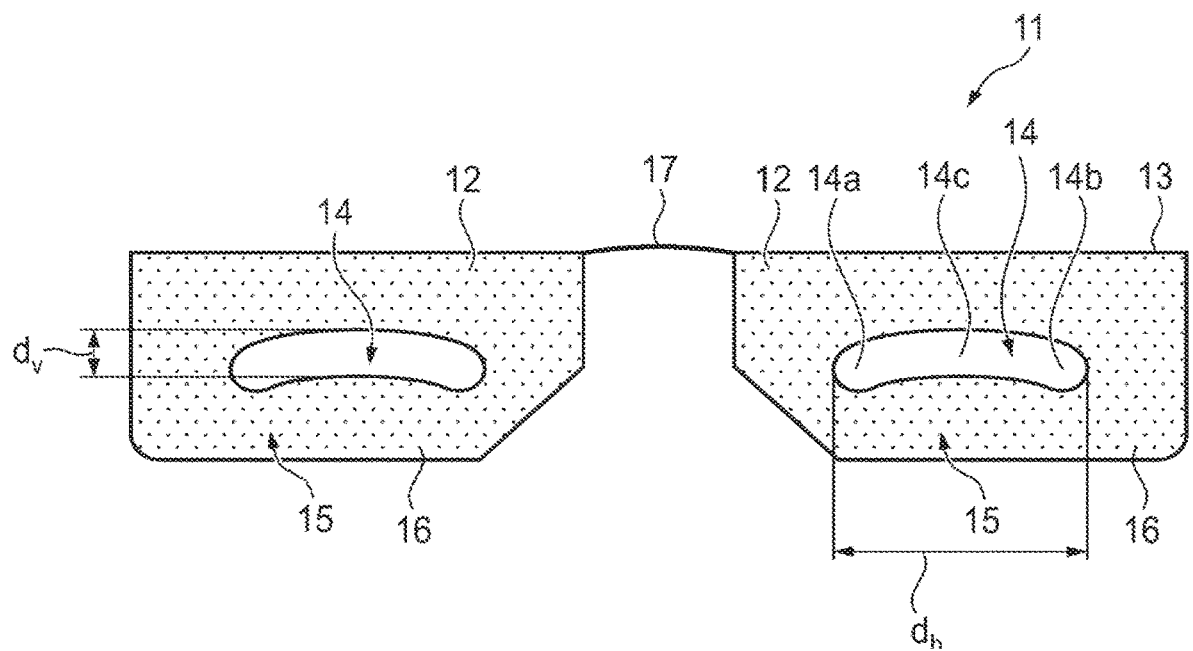
FIG. 2 shows an exemplary embodiment of a spectacle with a first zone that is elliptical and has a width that is at least four times the height of the first zone.

A second exemplary embodiment of the inventive spectacle lens design will be described with respect to FIG. 2 which shows spectacles 11 with spectacle lenses 12 manufactured according to the second exemplary embodiment of inventive spectacle lens design in a plan view. The spectacle lenses 12 can be regarded as representative for the spectacle lens design of the second exemplary embodiment.

In the present exemplary embodiment, the spectacles 11 comprise two single vision spectacle lenses 12, one for the right eye and one for left eye of the wearer. The two spectacle lenses 12 are mounted in a spectacle frame 13 and are separated by the bridge 17 of the spectacle frame 13. Due to the myopic wearer, the spectacle lenses 12 are designed to provide under-correction as compared to the wearer's prescription. Therefore, the spectacle lenses 12 may be zero or minus lenses.

Each of the spectacle lenses 12 includes a first zone 14 which resembles a clear zone for viewing objects. In other words, the first zone 14 provides for a clear image to the foveal zone of the retina of the wearer's eyes. This first zone is surrounded by a second zone 15 which, like the sub-zones 5a, 5b of the second zone in the first exemplary embodiment, provides scattering optical properties and can, therefore, be seen as a diffuser zone. The second zone 5 comprises a plurality of dot-shaped scattering centers 16 and fully surrounds the first zone 14 so that the first zone 14 can be seen as an aperture in the second zone 15.

By surrounding the first zone 14 the second zone 15 defines the shape and the extension of the first zone 14. In the present exemplary embodiment, the first zone 14 has an elliptical shape with a width, i.e., a dimension dh in horizontal direction, that exceeds the height, i.e., the dimension $d_v$ in vertical direction, by a factor of four. The height of the first zone 14 is chosen such that it allows for a vertical viewing angle of about 1.2 degree, i.e., a viewing angle which allows for clear sight of a letter with a size of 12 pt., when the spectacle lenses 12 are worn according to the dedicated as-worn position. The width of the first zone provides for a clear sight with a horizontal viewing angle of about 4.8 degree, which allows clearly viewing short to middle length words through the first zone 14 without eye movement, which in turn increases comfort when reading as compared to the state of the art spectacle lenses with circular clear zone as they are described, for example, in WO 2010/075319 A2, WO 2018/026697 A1, WO 2019/152438 A1 and WO 2020/014613 A1, respectively.

The first zone 14 includes a nasal segment 14a, i.e., a segment that is located towards the nasal rim 18 of the spectacle lens, a temporal segment 14b, i.e., a segment that is located towards the temporal rim 19 of the spectacle lens and a central segment 14c located between the nasal segment 14a and the temporal segment 14b. The first zone 14 is curved such that the nasal segment 14a and the temporal segment 14b are shifted downwards with respect to the central segment 14c. The curvature of the first zone 14 complies with the wearer's line of sight when reading a book at near distance when the wearer holds the book in a plane in front of him at a reading distance to the wearer's retina and he moves his eyes from left to right when reading a line of the book. With the curved first zone 14 it can be avoided that the contrast of a part of the currently read line reduces during the eye movement when reading a line due to the diffusing induced by the second zone 15a, even if the height of the first zone only allows for a vertical viewing angle that just allows for reading a letter in the size of 12 pt.

Figure 3:
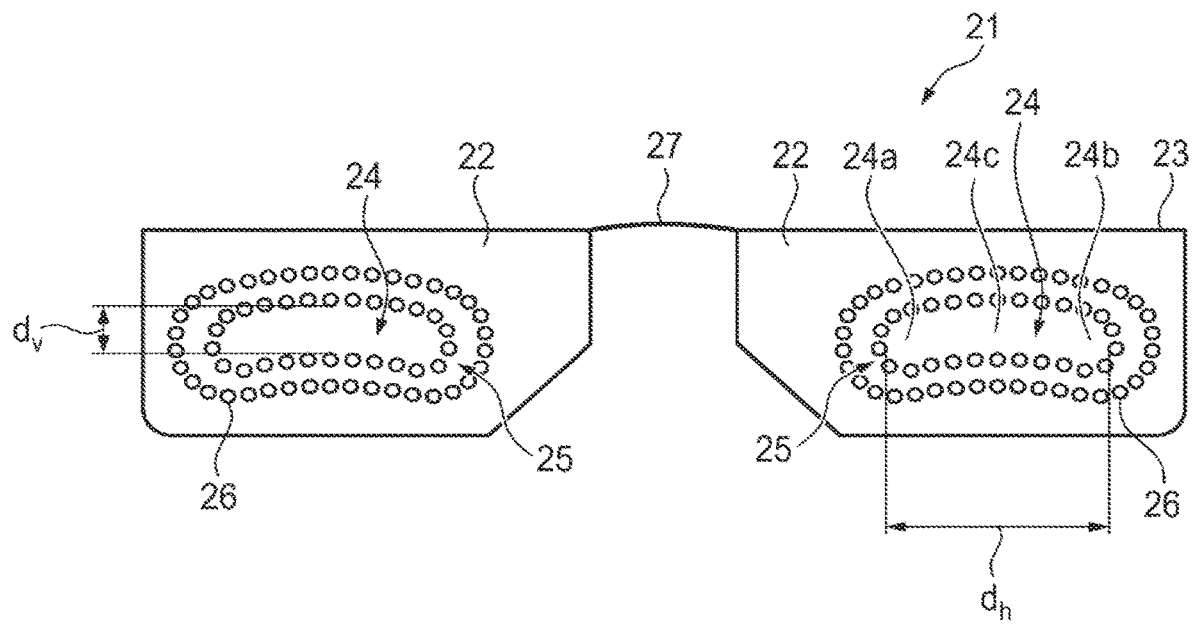
FIG. 3 shows another exemplary embodiment of a spectacle with a first zone that is elliptical and has a width that is at least four times the height of the first zone.

A third exemplary embodiment of the inventive spectacle lens design will be described with respect to FIG. 3 which shows spectacles 21 with spectacle lenses 22 manufactured according to the third exemplary embodiment of inventive spectacle lens design in a plan view. The spectacle lenses 22 can be regarded as representative for the spectacle lens design of the third exemplary embodiment.

In the present exemplary embodiment, the spectacles 21 comprise two single vision spectacle lenses 22, one for the right eye and one for left eye of the wearer. The two spectacle lenses 22 are mounted in a spectacle frame 23 and are separated by the bridge 27 of the spectacle frame 23. Due to the myopic wearer the spectacle lenses 22 are designed to provide full correction according to the wearer's prescription. The spectacle lenses 22 are therefore minus lenses.

Each of the spectacle lenses 22 includes a first zone 24 which resembles a clear zone for viewing objects. In other words, the first zone 24 provides for a clear image to the foveal zone of the retina of the wearer's eyes. This first zone is fully surrounded by a second zone 25 which provides a peripheral myopic defocus to a person looking straight ahead through the first zone 24. The peripheral myopic defocus is achieved by using a plurality of microlenses 26 which each add an additional focal power to the focal power of the spectacle lens 22. The additional power is chosen such that a sharp image is formed in front of the fovea of the wearer when the spectacle lenses 22 are used according to their dedicated as-worn position.

In the present exemplary embodiment, the microlenses 26 are distributed along two notional concentric elliptical lines. Those microlenses 26 that are distributed along the elliptical line with the smallest dimension surround a clear aperture with an elliptical shape that forms the first zone 24. Hence, the first zone, in particular its shape and size, is defined by the second zone. Note that in FIG. 3 the elliptical lines are only shown for illustrating the distribution of the microlenses 26 along the elliptical lines and that the elliptical lines are not physically present in the spectacle lens 22.

In the present exemplary embodiment, the elliptical first zone 24 has a width, i.e., a dimension dh in horizontal direction, that exceeds its height, i.e., the dimension $d_v$ in vertical direction, by a factor of four. The height of the first zone 24 is chosen such that it allows for a vertical viewing angle of about 1.0 degree. Such a viewing angle still allows for clear sight of a letter with a size of 12 pt. when the spectacle lenses 2 are worn according to the dedicated as-worn position. The width of the first zone provides for a clear sight with a horizontal viewing angle of about 4 degree, which allows clearly viewing at least short words through the first zone 24 without eye movement, which increases comfort when reading as compared to the state of the art spectacle lenses with circular clear zone as they are described, for example, in WO 2010/075319 A2, WO 2018/026697 A1, WO 2019/152438 A1 and WO 2020/014613 A1, respectively.

Moreover, in the present exemplary embodiment, the first and second zones 24, 25 are shifted towards the temporal rim of the spectacle lens 22 in the right spectacle lens, i.e., the spectacle lens for the right eye, and towards the nasal rim of the spectacle lens 22 in the left spectacle lens 22, i.e., the spectacle lens for the left eye. Note that the figures show the spectacle lenses such that the wearer looks through the spectacle lenses. Hence the spectacle lenses for the right eye are depicted on the right and the spectacle lenses for the left eye are depicted on the left in all figures. By shifting the first zones 24 as described above, the first zones 24 are shifted in reading direction for texts to be read from left to right. In case the spectacle lenses are designed for countries in which the reading direction is from right to left the first and second zones 24, 25 would be shifted towards the nasal rim of the spectacle lens 22 in the right spectacle lens and towards the temporal rim of the spectacle lens 22 in the left spectacle lens 22. The shift of the first and second zones 24, 25 improves reading comfort. Please note that although the first and second zones have been shifted in the present exemplary embodiment it would also be possible to only shift the first zone, in particular in cases in which the second zone extends over a substantial amount or over the whole of the spectacle lens outside the first zone.

The first zone 24 includes a nasal segment 24a, i.e., a segment that is located towards the nasal rim 28 of the spectacle lens, a temporal segment 24b, i.e., a segment that is located towards the temporal rim 29 of the spectacle lens and a central segment 24c located between the nasal segment 24a and the temporal segment 24b. The first zone 24 is curved such that the nasal segment 24a and the temporal segment 24b are shifted downwards with respect to the central segment 24c. The curvature of the first zone 24 complies with the wearer's line of sight when reading a book at near distance when the wearer holds the book in a plane in front of him at a reading distance to the wearer's retina and he moves his eyes from left to right when reading a line of the book. With the curved first zone 24 it can be avoided that the contrast of a part of the currently read line reduces during the eye movement when reading a line due to the diffusing induced by the second zone 25a, even if the height of the first zone only allows for a vertical viewing angle that just allows for reading a letter in the size of 12 pt.

Figure 4:
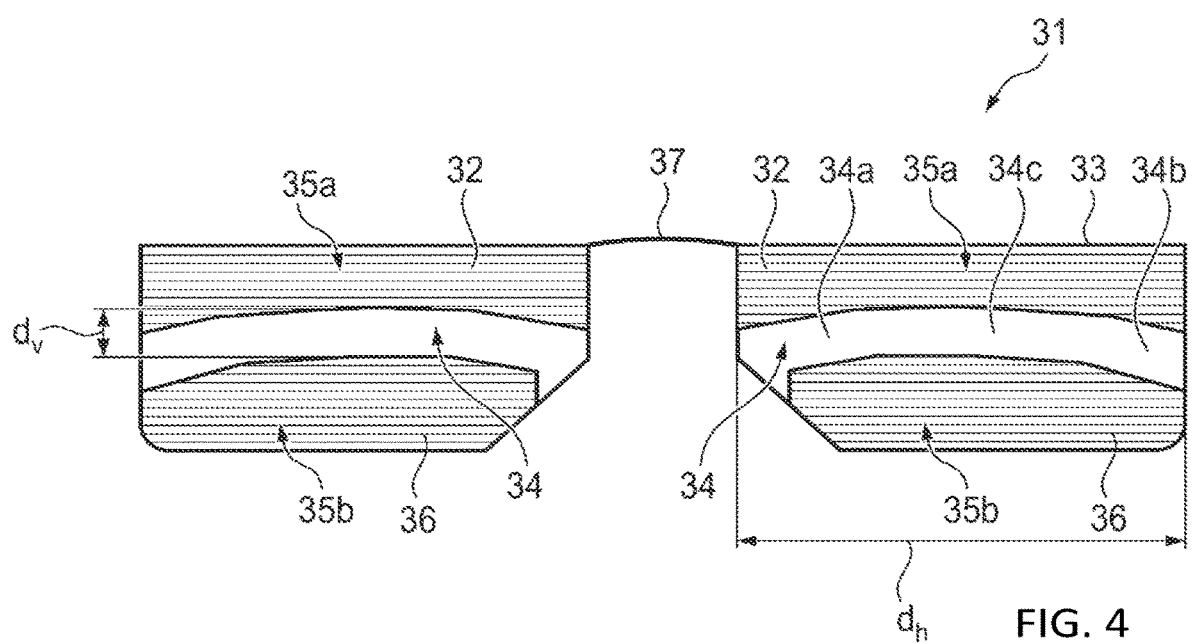
FIG. 4 shows another exemplary embodiment of a spectacle with a first zone with a width matching the width of the spectacle lens.

A fourth exemplary embodiment of the inventive spectacle lens design will be described with respect to FIG. 4 which shows spectacles 31 with spectacle lenses 32 manufactured according to the fourth exemplary embodiment of inventive spectacle lens design in a plan view. The spectacle lenses 32 can be regarded as representative for the spectacle lens design of the fourth exemplary embodiment.

In the present exemplary embodiment, the spectacles 31 comprise two single vision spectacle lenses 32, one for the right eye and one for left eye of the wearer. The two spectacle lenses 32 are mounted in a spectacle frame 33 and separated by the bridge 37 of the spectacle frame 33. Due to the myopic wearer the spectacle lenses 32 are designed to provide under-correction as compared to the wearer's prescription. The spectacle lenses 32, however, are minus lenses.

The present exemplary embodiment is similar to the first exemplary embodiment. Each of the spectacle lenses 32 includes a first zone 34 which resembles a clear zone for viewing objects. In other words, the first zone 34 provides for a clear image to the foveal zone of the retina of the wearer's eyes. Like in the first exemplary embodiment the first zone 34 of the present exemplary embodiment extends over the whole width of the spectacle lens 32, i.e., over its whole dimension $d_v$ in vertical direction, and is surrounded in vertical direction by a second zone which consists of two sub-zones zones 35a, 35b which are separated from each other by the first zone 34. The sub-zones zones 35a, 35b provide scattering optical properties. Therefore, the second zone of the present exemplary embodiment, i.e., its sub-zones 5a, 5b, forms a diffuser zone with two diffuser sub-zones. Like in the first exemplary embodiment, the sub-zones 35a, 35b of the second zone are stripe-shaped. However, in difference to the first exemplary embodiment the sub-zones 35a, 35b do not comprise a plurality of dot-shaped scattering centers but a plurality of line shaped scattering centers 36.

Since in the present exemplary embodiment, the height of the first zone 34 is given by the vertical distance between the sub-zones 35a, 35b of the second zone and is chosen such that it allows for a vertical viewing angle of about 1.2 degree when the spectacle lenses 2 are worn according to the dedicated as-worn position. Such a viewing angle allows for clearly viewing a letter of 12 pt. Due to the fact that the first zone 14 extends over the whole width of the spectacle lens 2 clear sight of the letters in a line is not hindered by the second zone which increases comfort when reading as compared to the state of the art spectacle lenses with circular zones of clear sight as they are described, for example, in WO 2010/075319 A2, WO 2018/026697 A1, WO 2019/152438 A1 and WO 2020/014613 A1, respectively.

The first zone 34 includes a nasal segment 34a, i.e., a segment that is located towards the nasal rim 38 of the spectacle lens, a temporal segment 34b, i.e., a segment that is located towards the temporal rim 39 of the spectacle lens and a central segment 34c located between the nasal segment 34a and the temporal segment 34b. The first zone 34 is curved such that the nasal segment 34a and the temporal segment 34b are shifted downwards with respect to the central segment 34c. The curvature of the first zone 34 complies with the wearer's line of sight when reading a book at near distance when the wearer holds the book in a plane in front of him at a reading distance to the wearer's retina and he moves his eyes from left to right when reading a line of the book. With the curved first zone 34 it can be avoided that the contrast of a part of the currently read line reduces during the eye movement when reading a line due to the diffusing induced by the second zone 35a, even if the height of the first zone only allows for a vertical viewing angle that just allows for reading a letter in the size of 12 pt.

Figure 5:
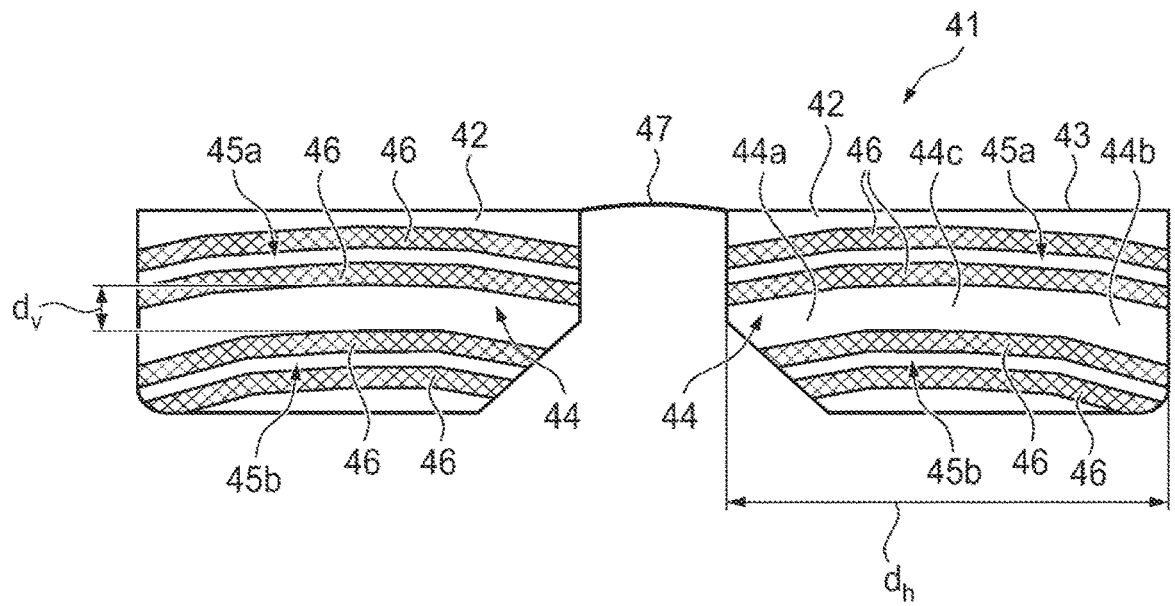
FIG. 5 shows still another exemplary embodiment of a spectacle with a first zone with a width matching the width of the spectacle lens.

A fifth exemplary embodiment of the inventive spectacle lens design will be described with respect to FIG. 5 which shows spectacles 41 with spectacle lenses 42 manufactured according to the fifth exemplary embodiment of inventive spectacle lens design in a plan view. The spectacle lenses 42 can be regarded as representative for the spectacle lens design of the fifth exemplary embodiment.

In the present exemplary embodiment, the spectacles 41 comprise two single vision spectacle lenses 42, one for the right eye and one for left eye of the wearer. The two spectacle lenses 42 are mounted in a spectacle frame 43 and separated by the bridge 47 of the spectacle frame 43. Due to the myopic wearer the spectacle lenses 42 are designed to provide near-vision full correction according to the wearer's prescription. The spectacle lenses 42, in the present case may comprise some astigmatic correction due to wearer's non-ideal shaped cornea.

Each of the spectacle lenses 42 includes a first zone 44 which resembles a clear zone for viewing objects. In other words, the first zone 44 provides for a clear image to the foveal zone of the retina of the wearer's eyes. This first zone 44 extends over the whole width of the spectacle lens 42, i.e., over its whole dimension $d_v$ in vertical direction, and is surrounded in vertical direction by a second zone which, in the present exemplary embodiment, consists of two sub-zones zones 45a, 45b which are separated from each other by the first zone 44. The sub-zones zones 45a, 45b provide a peripheral myopic defocus to the person looking straight ahead through the first zone 44. The peripheral myopic defocus is achieved by using a plurality of line shaped cylinder lenses 46 which each add an additional focal power to the focal power of the spectacle lens 42. The additional power is chosen such that a sharp image is formed in front of the fovea of the wearer when the spectacle lenses 42 are used according to their dedicated as-worn position.

In the present exemplary embodiment, the height of the first zone 44 is given by the vertical distance between the sub-zones 45a, 45b of the second zone and is chosen such that it allows for a vertical viewing angle of about 1.2 degree when the spectacle lenses 42 are worn according to the dedicated as-worn position. Such a viewing angle allows for clearly viewing a letter of 12 pt. Due to the fact that the first zone 44 extends over the whole width of the spectacle lens 42 clear sight of the letters in a line is not hindered by the second zone which increases comfort when reading as compared to the state of the art spectacle lenses with circular zones of clear sight as they are described, for example, in WO 2010/075319 A2, WO 2018/026697 A1, WO 2019/152438 A1 and WO 2020/014613 A1, respectively.

The first zone 44 includes a nasal segment 44a, i.e., a segment that is located towards the nasal rim 48 of the spectacle lens, a temporal segment 44b, i.e., a segment that is located towards the temporal rim 49 of the spectacle lens and a central segment 44c located between the nasal segment 44a and the temporal segment 44b. The first zone 44 is curved such that the nasal segment 44a and the temporal segment 44b are shifted downwards with respect to the central segment 44c. The curvature of the first zone 44 complies with the wearer's line of sight when reading a book at near distance when the wearer holds the book in a plane in front of him at a reading distance to the wearer's retina and he moves his eyes from left to right when reading a line of the book. With the curved first zone 44 it can be avoided that the contrast of a part of the currently read line reduces during the eye movement when reading a line due to the diffusing induced by the second zone 45a, even if the height of the first zone only allows for a vertical viewing angle that just allows for reading a letter in the size of 12 pt.

Figure 6:
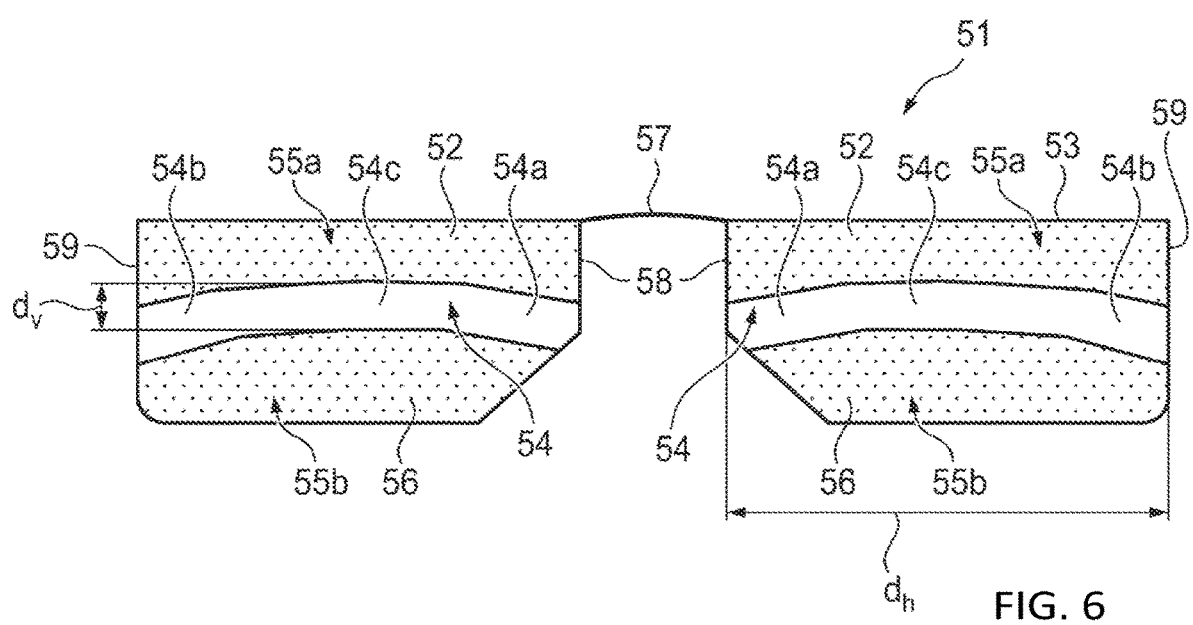
FIG. 6 shows still another exemplary embodiment of a spectacle with a first zone with a width matches the width of the spectacle lens.

A sixth exemplary embodiment of the inventive spectacle lens design will be described with respect to FIG. 6 which shows spectacles 51 with spectacle lenses 52 manufactured according to the sixth exemplary embodiment of inventive spectacle lens design in a plan view. The spectacle lenses 52 can be regarded as representative for the spectacle lens design of the sixth exemplary embodiment.

In the present exemplary embodiment, the spectacles 51 comprise two single vision spectacle lenses 52, one for the right eye and one for left eye of the wearer. The two spectacle lenses 52 are mounted in a spectacle frame 53 and separated by the bridge 57 of the spectacle frame 53. Due to the myopic wearer the spectacle lenses 52 are designed to provide full correction according to the wearer's prescription. The spectacle lenses 52 are therefore minus lenses.

Each of the spectacle lenses 52 includes a first zone 54 which resembles a clear zone for viewing objects providing. In other words, the first zone 54 provides for a clear image to the foveal zone of the retina of the wearer's eyes. This first zone 54 extends over the whole width of the spectacle lens 52, i.e., over its whole dimension $d_v$ in vertical direction, and is surrounded in vertical direction by a second zone which, in the present exemplary embodiment, consists of two sub-zones zones 55a, 55b which are separated from each other by the first zone 54. The sub-zones zones 55a, 55b include scattering centers 56 provide diffusing optical properties. Therefore, the second zone of the present exemplary embodiment, i.e., its sub-zones 55a, 55b, forms a diffuser zone with two diffuser sub-zones. The sub-zones 55a, 55b of the second zone are stripe-shaped and comprise a plurality of dot-shaped scattering centers 56.

In the present exemplary embodiment, the height of the first zone 54 is given by the vertical distance between the sub-zones 55a, 55b of the second zone and is chosen such that it allows for a vertical viewing angle of about 1.0 degree when the spectacle lenses 52 are worn according to the dedicated as-worn position. Such a viewing angle allows for clearly viewing a letter of 12 pt. Due to the fact that the first zone 54 extends over the whole width of the spectacle lens 52 clear sight of the letters in a line is not hindered by the second zone which increases comfort when reading as compared to the state of the art spectacle lenses with circular zones of clear sight as they are described, for example, in WO 2010/075319 A2, WO 2018/026697 A1, WO 2019/152438 A1 and WO 2020/014613 A1, respectively.

Figure 7:
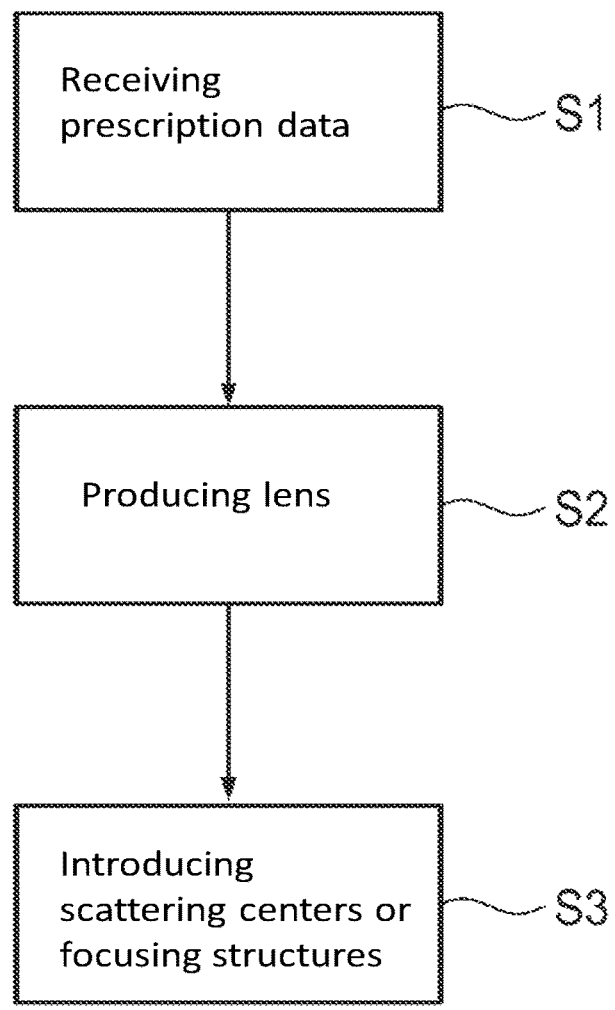
FIG. 7 shows a flow chart representing an exemplary embodiment for a method of manufacturing a spectacle lens.

In the sixth exemplary embodiment, the first zone 54 includes a nasal segment 54a, i.e., a segment that is located towards the nasal rim 58 of the spectacle lens, a temporal segment 54b, i.e., a segment that is located towards the temporal rim 59 of the spectacle lens and a central segment 54c located between the nasal segment 54a and the temporal segment 54b. The first zone 54 is curved such that the nasal segment 54a and the temporal segment 54b are shifted downwards with respect to the central segment 54c. The curvature of the first zone 54 complies with the wearer's line of sight when reading a book at near distance when the wearer holds the book in a plane in front of him at a reading distance to the wearer's retina and he moves his eyes from left to right when reading a line of the book. With the curved first zone 54 it can be avoided that the contrast of a part of the currently read line reduces during the eye movement when reading a line due to the diffusing induced by the second zone 55a, even if the height of the first zone only allows for a vertical viewing angle that just allows for reading a letter in the size of 12 pt. Although the curved first zone 54 has been described in conjunction with a second zone 55 providing reduced contrast due to scattering centers in the second zone 55 it can as well be used in conjunction with a second zone that provides a peripheral myopic defocus. Next, an exemplary embodiment for a method of manufacturing the spectacle lens with an inventive lens design will be described with respect to FIG. 7.

In a first step, S1, data from a prescription is received where the prescription includes a summary of the dioptric powers necessary for correcting a diagnosed refractive error. In case of a myopic eye the prescription contains at least a value "sph" for sphere. In addition, in case of an additional astigmatism it may also contain values for "cyl" for cylinder and a value "axis" for the axis of the cylinder. Further values may also present in the prescription like, for example a prism value. If the second zone shall provide a peripheral myopic defocus, the prescription also contains a value for an additional power, which shall be used for providing the peripheral myopic defocus. However, in the present exemplary embodiment a diffuser zone is provided in the second zone.

In the present exemplary embodiment, the values contained in the prescription are based on a measurement performed by an eye care professional with a patient, where the measurement provides for refraction data relating to the eyes of the patient. The refraction data may either be objective refraction data, i.e., refraction data measured objectively by means of a refractometer or the like, or subjective refraction data. In case of subjective refraction data, this data may be collected by letting the patient look at a text or at optotypes with different sizes while trying various test lenses until the patient experiences a satisfying visual acuity.

However, instead of values of a prescription it would also be possible to provide the measured data in form of other suitable values, for example in form of Zernike coefficients. In addition, it would also be possible to receive the values representing objective refraction data directly from a refractometer or from any other suitable measurement apparatus.

Based on the measured data received in step S1, a single vision spectacle lens with a focal power that provides a focused image on the fovea (assisted by accommodation) when the wearer looks trough the spectacle lens worn according to an as-worn position is produced by means of a suitable process in step S2. Suitable processes can, for example be molding processes or a machining processes. If a machining process is used, the single vision lens can, for example, be manufactured from a semi-finished blank, which includes an already finished front surface. The back surface of the semi-finished blank is then machined so that the semi-finished blank becomes the single vision spectacle lens with the requested focal power.

In step S3 scattering centers are introduced into a zone of the single vision spectacle lens which shall become the diffuser zone, i.e., the second zone. This can be done by any suitable method, for example by means of a laser generating point-shaped or line-shaped depressions in the back surface of the single vision spectacle lens or by means of a doping process. The scattering centers are introduced such into the single vision spectacle lens that the second zone at least partly surrounds a zone without scattering centers. Hence, the zone without scattering centers allows for clear vision with the focal power that provides a focused image on the fovea and forms the first zone. In other words, shape and size of the first zone are defined by the second zone, in some cases in conjunction with the rim of the spectacle lens. If the second zone fully surrounds the first zone height and width of the first zone are defined by the second zone. If, on the other hand, the second zone only surrounds the first zone vertically the height of the first zone is defined by the second zone while its width is given by the width of the spectacle lens. Moreover, there may also be cases in which the second zone surrounds the first zone upwards, downwards and nasal-wards or upwards, downwards and temporal-wards so that the first zone would be limited by the second zone in three directions and by the rim of the spectacle lens in a fourth direction. However, in all cases the first zone can be seen as being defined by the second zone within the limits of the spectacle lens irrespective of whether the second zone fully or partly surround the first zone.

The scattering centers are introduced such that the aperture has such a height that it covers a vertical viewing angle of 0.8 to 1.5 degree, in particular a vertical viewing angle of 1.0 to 1.2 degree, for example 1.0 degree or 1.2 degree, when a spectacle lens is positioned according to the dedicated as-worn position. Moreover, the scattering centers are introduced such that the aperture has a width that is at least four times its height. The scattering centers may be introduced such that they surround the aperture by 360 degree or such that the aperture extends to at least one of the nasal and temporal rim of the spectacle lens.

In case the second zone shall comprise focusing structures instead of scattering centers where the focusing structures provide a peripheral myopic defocus when the wearer looks through the first zone an alternative step S3 is used. In this alternative step S3, a mold is set on the back surface of the single vision spectacle lens where the molding surface of the mold represents the negative shape of the focusing structures to be manufactured. With the mold set on the back surface of the single vision spectacle lens the focusing structures are formed on the back surface by injection molding or any other suitable molding process. After the molding process a polishing process for removing any ridges remaining from the molding process may follow. However, applying the focusing structures to the back surface of the single vision spectacle lens does not need to be done by means of a molding process. Other processes such as, for example swelling processes like oleic acid swelling or additive manufacturing processes like inkjet printing may also be used. Although in the present exemplary embodiment the focusing structures are formed on the back surface they may as well be formed on the front surface of the single vision spectacle lens.

After the forming the second zone in step S3, i.e., after providing the scattering centers or the focusing structures the spectacle lens is finished.

The concepts of the present disclosure have been described with respect to exemplary embodiments thereof for illustrating the disclosure. However, a person skilled in the art realizes that the concepts of the present disclosure can be implemented by variants of the exemplary embodiments. For example, number and shape of the focusing structures may differ from those described in the exemplary embodiments. Moreover, a person skilled in the art can envisage other manufacturing techniques for providing the focusing structures. For example, instead of forming the focusing structures on the front or back surface of the spectacle lens it would also be possible to provide zones in the spectacle lens which have a refractive index that differs from the refractive index of the rest of the spectacle lens. Providing such zoned can for example be done by a doping process. As a consequence, the focusing structures would be present in the spectacle lens rather than on a surface of the spectacle lens. Therefore, the present disclosure shall not be limited by the exemplary embodiments but only by the appended claims.

The invention claimed is:

1. A spectacle lens kit comprising:
   a spectacle lens including:
      a first zone, the first zone having a first focal power configured for vision of a wearer's eye at a near distance; and
      at least one second zone at least partly surrounding the first zone, wherein the second zone contains at least one of the following:
         (i) focusing structures having a second focal power being higher than the first focal power, or
         (ii) diffusing structures configured to diffuse light passing the at least one second zone; and
      instructions including an as-worn position of the spectacle lens relative to the a wearer's eye and a predetermined object distance model that includes object distances for different viewing directions under which the wearer should see clearly when the spectacle lens is worn according to the as-worn position,
      the first zone including a nasal segment and a central segment, the nasal segment being shifted downward with respect to the central segment, such that the first zone is curved to follow a converging line of sight of the wearer upon reading when the spectacle lens is positioned relative to the eye of the wearer according to the as-worn position and an arrangement of an object according to the predetermined object distance model.

2. The spectacle lens kit as claimed in claim 1, wherein the first zone has a width and a height, the width and the height of the first zone being at least one from the following group:
   a) the width of the first zone being at least three times the height of the first zone,
   b) the width of the first zone being at least four times the height of the first zone, or
   c) the width of the first zone being at least five times the height of the first zone.

3. The spectacle lens kit as claimed in claim 1, wherein the first zone has a height and a width, the height and the width of the first zone being at least one of the following group:
   a) the height of the first zone being uniform along at least a part of the width of the first zone, wherein the uniform height of the first zone within the part is a value in the range between 3 mm and 5 mm, and wherein the part of the width is at least three times the uniform height,
   b) wherein the uniform height of the first zone along the part of the width is a value in the range between 3 mm and 5 mm, and wherein the part of the width is at least four times the uniform height,
   c) wherein the uniform height of the first zone along the part of the width is a value in the range between 4 mm and 5 mm, and wherein the part of the width is at least three times the uniform height, or
   d) wherein the uniform height of the first zone along the part of the width is a value in the range between 4 mm and 5 mm, and wherein the part of the width is at least four times the uniform height.

4. The spectacle lens kit as claimed in claim 1, wherein at least one of the following applies:
   the height of the first zone is configured to cover a vertical viewing angle of 0.8 to 1.5 degrees when the spectacle lens is positioned according to the as-worn position, and/or
   the width of the first zone matches the width of the spectacle lens.

5. The spectacle lens kit as claimed in claim 1, wherein the first zone further comprises:
   a temporal segment, wherein the temporal segment is shifted downwards with respect to the central segment.

6. A data set stored on a non-transitory computer-readable medium, the data set comprising at least one kind of the following kinds of data:
   (i) a numerical representation of the spectacle lens as claimed in claim 1, wherein the numerical representation of the spectacle lens is configured to be used for a manufacture of the spectacle lens,
   (ii) the numerical representation of the spectacle lens as claimed in claim 1, wherein the numerical representation of the spectacle lens is configured to be used by one or more manufacturing machines in order to manufacture the spectacle lens, or
   (iii) data containing computer-readable instructions for controlling one or more manufacturing machines to produce the spectacle lens as claimed in claim 1.

7. The spectacle lens kit as claimed in claim 1, wherein a geometric center of the first zone is located at least vertically off-center with respect to a penetration point of a center ray of a bundle of rays which penetrates the spectacle lens when reading while looking straight ahead at the reading target and shifted temporal-wards if the spectacle lens is to be used for the right eye or the left eye and nasal-wards if the spectacle lens is to be used for the respective other eye.

8. A data set stored on a computer-readable medium and comprising at least one kind of the following kinds of data:
(i) a numerical representation of the spectacle lens kit as claimed in claim 1 including a numerical representation of the spectacle lens and a numerical representation of the instructions including the as-worn position of the spectacle lens,
(ii) the numerical representation of the spectacle lens kit as claimed in claim 1 including the numerical representation of the spectacle lens and the numerical representation of the instructions including the as-worn position of the spectacle lens, wherein the numerical representation of the spectacle lens is configured to be used by one or more manufacturing machines to manufacture the spectacle lens, or
(iii) the numerical representation of the spectacle lens kit as claimed in claim 1 including the numerical representation of the spectacle lens and the numerical representation of the instructions including the as-worn position of the spectacle lens and data containing computer-readable instructions for controlling one or more manufacturing machines to produce the spectacle lens.

9. The computer-implemented method as claimed in claim 1, further comprising:
manufacturing the spectacle lens according to the design.

10. A computer-implemented method of designing a spectacle lens for the purpose of a use of the design for a manufacture of the spectacle lens, the method comprising:
designing the spectacle lens to include a second zone with at least one of:
(i) focusing structures having a second focal power being higher than a first focal power, or
(ii) diffusing structures configured to diffuse light passing the second zone, wherein the second zone is configured to define a first zone, by at least partly surrounding the first zone, the first zone including a nasal segment and a central segment, the nasal segment being shifted downward with respect to the central segment, and having the first focal power,
wherein designing the second zone includes defining the first zone by the at least partly surrounding second zone to be curved so as to follow a converging line of sight of the wearer upon reading, when the spectacle lens is positioned relative to the eye of a wearer according to an as-worn position and an arrangement of an object according to a predetermined object distance model that includes object distances for different viewing directions under which the wearer should see clearly when the spectacle lens is worn according to the as-worn position, and
wherein the first focal power is configured for vision of the eye of the wearer at a near distance.

11. The computer-implemented method as claimed in claim 10, wherein the first zone is designed to have a width and a height, the width and the height of the first zone being at least one of the following group:
a) the width of the first zone being at least three times the height of the first zone,
b) the width of the first zone being at least four times the height of the first zone, or
c) the width of the first zone being at least five times the height of the first zone.

12. The computer-implemented method as claimed in claim 10, wherein the first zone is designed to have a height and a width, the height and the width of the first zone being at least one of the following group:

a) the height of the first zone being uniform along at least a part of the width of the first zone, wherein the uniform height of the first zone within the part of the width has a value in the range between 3 mm and 5 mm, and wherein the part of the width is at least three times the uniform height,
b) wherein the uniform height of the first zone along the part of the width has a value in the range between 3 mm and 5 mm, and wherein the part of the width is at least four times the uniform height,
c) wherein the uniform height of the first zone along the part of the width has a value in the range between 4 mm and 5 mm, and wherein the part of the width is at least three times the uniform height, or
d) wherein the uniform height of the first zone along the part has a value in the range between 4 mm and 5 mm, and wherein the part of the width is at least four times the uniform height.

13. The computer-implemented method as claimed in claim 10, wherein at least one of the following applies:
the second zone is designed such that the first zone defined by the at least partly surrounding second zone has such dimensions as to cover a vertical viewing angle of 0.8 to 1.5 degree when the designed spectacle lens is positioned according to the as-worn position, and/or
the second zone is designed such that the width of the first zone matches the width of the spectacle lens design.

14. A computer program stored on a non-transitory storage medium for designing a spectacle lens for the purpose of a use of the design for a manufacture of the spectacle lens, the spectacle lens to be positioned relative to an eye of a wearer according to a given as-worn position and the predetermined object distance model that includes object distances for different viewing directions under which the spectacle wearer should see clearly when the spectacle lens is worn according to the as-worn position, the computer program comprising instructions that, when executed on a computer, prompt the computer to perform the computer-implemented method as claimed in claim 10.

15. The computer-implemented method as claimed in claim 10, wherein the first zone defined by the at least partly surrounding second zone further includes a temporal segment, wherein the first zone is curved such that the temporal segment is shifted downwards with respect to the central segment.

16. The computer-implemented method as claimed in claim 10, wherein at least one of the following applies:
the first zone has such dimensions as to cover a vertical viewing angle of 0.8 to 1.5 degree when the designed spectacle lens is positioned according to the as-worn position,
the width of the first zone matches the width of the spectacle lens design, or
the width of the first zone is at least six times the height of the first zone.

17. The computer-implemented method as claimed in claim 10, wherein a geometric center of the first zone is located at least vertically off-center with respect to a penetration point of a center ray of a bundle of rays which penetrates the spectacle lens when reading while looking straight ahead at the reading target and shifted temporal-wards if the designed spectacle lens is to be used for the right eye or the left eye and nasal-wards if the designed spectacle lens is to be used for the respective other eye.

18. A spectacle lens comprising:
a first zone having a focal power, the first zone having a height and a width; and
at least one second zone at least partly surrounding the first zone, wherein the second zone contains at least one of the following:
  (i) focusing structures having a positive additional power with respect to the focal power of the first zone; or
  (ii) diffusing structures configured to diffuse light passing the at least one second zone,
wherein the width of the first zone is at least four times the height of the first zone, and
wherein the first zone includes a nasal segment, a temporal segment, and a central segment located between the nasal segment and the temporal segment, the first zone being curved such that the nasal segment and/or the temporal segment are shifted downwards with respect to the central segment.

19. The spectacle lens as claimed in claim 18, wherein the width of the first zone matches the width of the spectacle lens or wherein the width of the first zone is at least six times the height of the first zone.

20. A spectacle lens kit comprising:
the spectacle lens as claimed in claim 18; and
instructions including an as-worn position of the spectacle lens, wherein the height of the first zone is configured to cover a vertical viewing angle of 0.8 to 1.5 degree when the spectacle lens is positioned according to the as-worn position, wherein the as-worn position is the position, including orientation, of the spectacle lenses relative to the eyes and face during wear as defined in DIN ISO 13666:2019, section 3.2.36.

21. A computer-implemented method of designing a spectacle lens for the purpose of a use of the design for a manufacture of the spectacle lens, the method comprising:
designing a second zone at least partly surrounding a first zone having a height and a width, the second zone including at least one of:
  (i) focusing structures providing a positive additional power with respect to the focal power present in the first zone, or
  (ii) diffusing structures configured to diffuse light,
wherein the first zone includes a nasal segment and a central segment, the nasal segment being shifted downward with respect to the central segment, and has a width and a height, the width of the first zone being at least four times the height of the first zone; and
designing the second zone such that the first zone is curved so as to follow a converging line of sight of the wearer wearing the spectacle lens in an as-worn position upon reading.

22. A computer program stored on a non-transitory storage medium and comprising instructions which, when the program is executed by a computer, cause the computer to carry out the method as claimed in claim 21.

23. A method of manufacturing a spectacle lens to be positioned relative to an eye of a wearer according to a given as-worn position, the method comprising:
providing the spectacle lens with a focal power, and
forming in a zone of the spectacle lens at least one of:
  (i) focusing structures providing a positive additional power with respect to the focal power, or
  (ii) diffusing structures configured to diffuse light,
wherein the zone is formed as a second zone that defines a first zone by at least partly surrounding the first zone, the first zone having a height and a width, wherein the second zone is formed with such dimensions that the width of the first zone defined by the at least partly surrounding second zone is at least four times the height of the first zone,
wherein the second zone is formed such that the first zone defined by the at least partly surrounding second zone includes a nasal segment, a temporal segment, and a central segment located between the nasal segment and the temporal segment, and
wherein the first zone is curved such that the nasal segment and/or the temporal segment are shifted downwards with respect to the central segment.

* * * * *